United States Patent
Johnson et al.

(10) Patent No.: US 12,239,218 B2
(45) Date of Patent: *Mar. 4, 2025

(54) MOLDED PLASTIC STRUCTURES

(71) Applicant: LIFETIME PRODUCTS, INC., Clearfield, UT (US)

(72) Inventors: Mitch Johnson, South Weber, UT (US); Kevin Boydston, Clinton, UT (US); Leo Cai, Xiamen (CN)

(73) Assignee: LIFETIME PRODUCTS, INC., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,187

(22) Filed: Sep. 25, 2023

(65) Prior Publication Data

US 2024/0008639 A1    Jan. 11, 2024

Related U.S. Application Data

(63) Continuation of application No. 17/459,676, filed on Aug. 27, 2021, now Pat. No. 11,766,116.

(51) Int. Cl.
*A47B 13/08*     (2006.01)
*A47B 13/00*     (2006.01)
*B29C 49/00*     (2006.01)
*B29C 49/04*     (2006.01)
(Continued)

(52) U.S. Cl.
CPC ............ *A47B 13/08* (2013.01); *A47B 13/003* (2013.01); *B29C 49/0031* (2013.01); *B29C 49/04* (2013.01); *B29C 49/4802* (2013.01); *A47B 2200/001* (2013.01); *B29K 2995/0077* (2013.01); *B29K 2995/0082* (2013.01); *B29K 2995/0089* (2013.01); *B29L 2031/448* (2013.01)

(58) Field of Classification Search
CPC ..... A47B 13/08; A47B 13/003; A47B 13/083; A47B 2200/001; B29L 2031/448
See application file for complete search history.

(56) References Cited

U.S. PATENT DOCUMENTS

| 4,280,805 A | 7/1981 | Hafele |
| 4,379,688 A | 4/1983 | Tate |
| 4,727,816 A | 3/1988 | Virtue |

(Continued)

FOREIGN PATENT DOCUMENTS

| CN | 102293518 | 12/2011 |
| CN | 104939514 | 9/2015 |

(Continued)

*Primary Examiner* — Daniel J Rohrhoff
(74) *Attorney, Agent, or Firm* — Maschoff Brennan

(57) ABSTRACT

A structure, such as a tabletop, may be constructed from blow-molded plastic. The tabletop may include an upper surface, a lower surface, and a hollow interior portion disposed between the upper surface and the lower surface. A lip may extend downwardly relative to the lower surface of the tabletop, and the lip including an outer surface and an inner surface. One or more supports may be disposed in the inner surface of the lip, and one or more joints may be disposed in the inner surface of the lip. A joint may be disposed between adjacent supports, and a distal portion of the lip may include a compression edge. A lower portion of the supports may contact the compression edge, and/or a lower portion of the joints may contact the compression edge.

20 Claims, 21 Drawing Sheets

(51) Int. Cl.
    *B29C 49/48*        (2006.01)
    *B29L 31/44*        (2006.01)

(56) References Cited

U.S. PATENT DOCUMENTS

| | | |
|---|---|---|
| 6,912,961 B2 | 7/2005 | Winter et al. |
| 6,968,789 B2 | 11/2005 | Baik et al. |
| 7,051,662 B2 | 5/2006 | Shenghao et al. |
| 7,059,254 B2 | 6/2006 | Strong et al. |
| 7,096,799 B2 | 8/2006 | Strong et al. |
| 7,111,563 B2 | 9/2006 | Strong |
| 7,150,237 B2 | 12/2006 | Lin |
| 7,171,910 B2 | 2/2007 | Neunzert |
| 7,278,361 B2 | 10/2007 | Zhurong et al. |
| 7,331,297 B2 | 2/2008 | Strong et al. |
| 7,469,646 B2 | 12/2008 | Baik et al. |
| 7,475,642 B2 | 1/2009 | Shenghao et al. |
| 7,475,643 B2 | 1/2009 | Haney et al. |
| 7,475,644 B2 | 1/2009 | Strong et al. |
| 7,640,870 B2 | 1/2010 | Strong et al. |
| 7,644,667 B2 | 1/2010 | Strong et al. |
| 7,713,603 B2 | 5/2010 | Farran et al. |
| D619,831 S | 7/2010 | Branch |
| 7,905,185 B2 | 3/2011 | Peery et al. |
| D640,487 S | 6/2011 | Bennett |
| 7,971,930 B2 | 7/2011 | Larsen et al. |
| 8,006,630 B2 | 8/2011 | Strong et al. |
| 8,033,228 B2 | 10/2011 | Haney et al. |
| 8,156,875 B2 | 4/2012 | Neunzert et al. |
| D658,912 S | 5/2012 | Winter et al. |
| D659,450 S | 5/2012 | Winter et al. |
| 8,166,894 B1 | 5/2012 | Branch et al. |
| 8,181,579 B2 | 5/2012 | Leng |
| D662,736 S | 7/2012 | Peery et al. |
| D662,738 S | 7/2012 | Winter et al. |
| D667,659 S | 9/2012 | Winter et al. |
| 8,261,676 B2 | 9/2012 | VanNimwegen |
| D668,483 S | 10/2012 | Bennett |
| 8,302,541 B2 | 11/2012 | Haney et al. |
| D671,773 S | 12/2012 | Johnson et al. |
| D671,775 S | 12/2012 | Clegg et al. |
| D671,776 S | 12/2012 | Clegg et al. |
| D672,175 S | 12/2012 | Peery et al. |
| 8,342,107 B2 | 1/2013 | Mower et al. |
| 8,347,795 B2 | 1/2013 | Peery et al. |
| 8,397,652 B2 | 3/2013 | Peery et al. |
| 8,397,653 B2 | 3/2013 | Ashby et al. |
| 8,408,146 B2 * | 4/2013 | Peery ............... A47B 7/02 108/157.1 |
| D681,982 S | 5/2013 | Clegg et al. |
| D682,586 S | 5/2013 | Clegg et al. |
| D683,985 S | 6/2013 | Nye et al. |
| D688,496 S | 8/2013 | Bennett |
| 8,534,205 B1 | 9/2013 | Johnson et al. |
| 8,544,393 B2 | 10/2013 | Branch et al. |
| 8,555,789 B2 | 10/2013 | Jin et al. |
| 8,555,790 B2 | 10/2013 | Winter et al. |
| 8,555,791 B2 | 10/2013 | Jin et al. |
| 8,578,863 B2 | 11/2013 | Peery et al. |
| 8,578,865 B2 | 11/2013 | Haney et al. |
| D696,882 S | 1/2014 | Clegg et al. |
| 8,622,007 B2 | 1/2014 | Peery et al. |
| D700,465 S | 3/2014 | Johnson et al. |
| 8,677,912 B1 * | 3/2014 | Tsai ............... F16C 11/10 108/132 |
| 8,683,929 B2 | 4/2014 | Peery et al. |
| 8,720,990 B2 | 5/2014 | Boydston |
| 8,726,817 B2 | 5/2014 | Bennett et al. |
| 8,746,155 B2 | 6/2014 | Haney et al. |
| 8,757,069 B2 | 6/2014 | Peery et al. |
| D708,462 S | 7/2014 | Nye et al. |
| D715,081 S | 10/2014 | Bennett |
| 8,857,349 B2 | 10/2014 | Peery et al. |
| 8,904,943 B2 | 12/2014 | Jin et al. |
| 8,943,982 B2 | 2/2015 | Peery et al. |
| D727,074 S | 4/2015 | Johnson et al. |
| 8,997,663 B2 | 4/2015 | Peery et al. |
| D733,475 S | 7/2015 | Johnson |
| D734,081 S | 7/2015 | Johnson et al. |
| 9,101,209 B2 | 8/2015 | Bennett et al. |
| D739,672 S | 9/2015 | Johnson et al. |
| D739,673 S | 9/2015 | Johnson |
| 9,138,050 B2 | 9/2015 | Peery et al. |
| D742,671 S | 11/2015 | Johnson |
| 9,173,482 B2 | 11/2015 | Peery et al. |
| 9,192,229 B2 | 11/2015 | Peery et al. |
| 9,192,230 B2 | 11/2015 | Clegg et al. |
| D748,418 S | 2/2016 | Johnson et al. |
| 9,277,808 B2 | 3/2016 | Cai et al. |
| 9,307,831 B2 | 4/2016 | Peery et al. |
| D756,694 S | 5/2016 | Johnson |
| 9,351,563 B2 | 5/2016 | Bennett et al. |
| D759,411 S | 6/2016 | Johnson et al. |
| 9,486,076 B2 | 11/2016 | Peery et al. |
| 9,532,644 B2 | 1/2017 | Nye et al. |
| 9,549,612 B2 | 1/2017 | Peery et al. |
| 9,591,918 B2 | 3/2017 | Nye et al. |
| 9,642,459 B2 | 5/2017 | Peery et al. |
| 9,661,916 B2 | 5/2017 | Peery et al. |
| 9,730,514 B2 | 8/2017 | Peery |
| 9,763,513 B2 | 9/2017 | Cai et al. |
| 9,763,517 B2 | 9/2017 | Peery et al. |
| 9,848,699 B2 | 12/2017 | Peery et al. |
| 10,092,091 B1 | 10/2018 | Wang |
| D863,853 S | 10/2019 | Johnson et al. |
| D864,637 S | 10/2019 | Johnson et al. |
| 10,932,560 B2 | 3/2021 | Leng |
| 11,324,311 B2 | 5/2022 | Johnson |
| 11,730,262 B2 | 8/2023 | Johnson |
| 11,766,116 B2 * | 9/2023 | Johnson ............... B29C 49/4802 108/115 |
| 11,766,117 B2 | 9/2023 | Johnson |
| 11,930,919 B2 | 3/2024 | Johnson |
| 2003/0233968 A1 | 12/2003 | Strong |
| 2005/0103239 A1 | 5/2005 | Neunzert |
| 2005/0160950 A1 * | 7/2005 | Haney ............... A47B 13/08 108/129 |
| 2005/0274306 A1 | 12/2005 | Strong |
| 2006/0230989 A1 | 10/2006 | Haney |
| 2007/0199483 A1 | 8/2007 | Peery |
| 2011/0253015 A1 | 10/2011 | Trimble |
| 2012/0024201 A1 | 2/2012 | Haney |
| 2012/0266787 A1 | 10/2012 | Peery |
| 2013/0055930 A1 | 3/2013 | Peery |
| 2013/0081560 A1 * | 4/2013 | Peery ............... A47B 3/0911 108/160 |
| 2013/0291481 A1 * | 11/2013 | Haney ............... A47B 3/091 52/800.1 |
| 2014/0060399 A1 | 3/2014 | Peery |
| 2014/0175710 A1 | 6/2014 | Groman |
| 2016/0051049 A1 * | 2/2016 | Peery ............... A47B 13/083 108/91 |
| 2017/0238698 A1 | 8/2017 | Nye |
| 2019/0150608 A1 * | 5/2019 | Johnson ............... B29C 49/0031 |
| 2020/0214440 A1 * | 7/2020 | Johnson ............... B29C 49/0005 |
| 2020/0337452 A1 | 10/2020 | Leng |
| 2021/0022502 A1 | 1/2021 | Jiang |
| 2021/0330073 A1 * | 10/2021 | Choi ............... B29C 49/0031 |
| 2022/0031072 A1 | 2/2022 | Lin |
| 2022/0281204 A1 | 9/2022 | Jiang |
| 2022/0288835 A1 | 9/2022 | Jiang |
| 2023/0389694 A1 | 12/2023 | Johnson |
| 2024/0008638 A1 | 1/2024 | Johnson |
| 2024/0215710 A1 | 7/2024 | Johnson |

FOREIGN PATENT DOCUMENTS

| | | |
|---|---|---|
| EP | 3000353 | 3/2016 |
| WO | 2017045579 | 3/2017 |
| WO | 2017147245 | 8/2017 |
| WO | 2021013264 | 1/2021 |

* cited by examiner

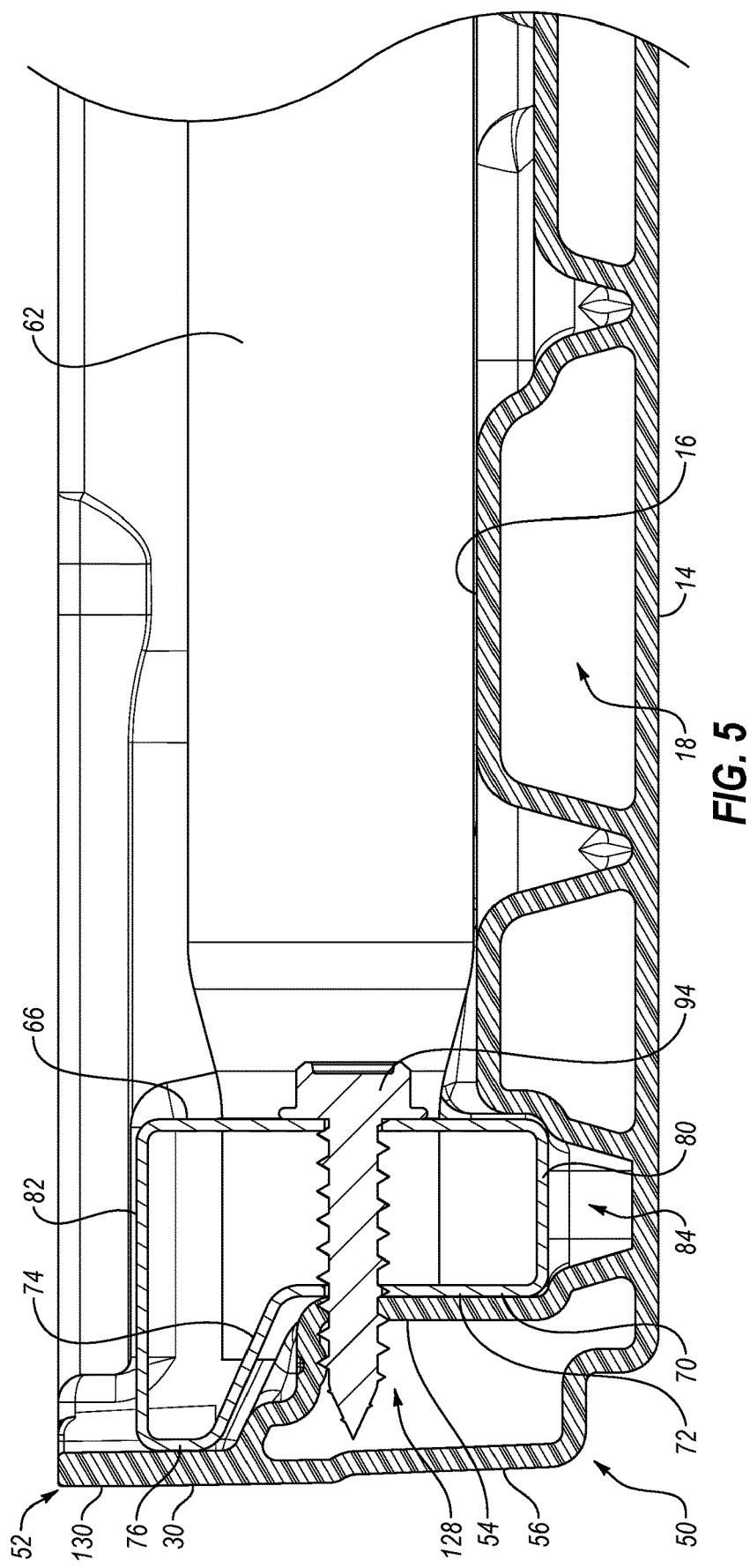

MOLDED PLASTIC STRUCTURES

CROSS-REFERENCE TO RELATED APPLICATIONS

The present application is a continuation of U.S. patent application Ser. No. 17/459,676, filed on Aug. 27, 2021, now U.S. Pat. No. 11,766,116, issued Sep. 26, 2023, which is incorporated by reference in its entirety.

BACKGROUND

Field of the Invention

The present invention generally relates to structures including at least a portion constructed from plastic and, more particularly, to furniture, such as tables, that may include molded plastic components.

Description of Related Art

Many different types of tables are known, and tables are used for a variety of purposes. For example, conventional tables may include legs that are pivotally attached to a tabletop and the legs may be movable between a use position in which the legs extend outwardly from the tabletop and a storage position in which the legs are folded against the tabletop. Conventional tables with relatively large tabletops and folding legs are often referred to as "banquet tables" and these tables are frequently used in assembly halls, banquet halls, convention centers, hotels, schools, churches, and other locations where large groups of people meet. These tables can often be positioned in an assortment of configurations and used in a variety of settings. When the banquet tables are no longer needed, the table legs can be moved into the storage position and the tables may be more easily moved or stored.

Conventional tables often include tabletops constructed from materials such as wood, particleboard, or metal. Tabletops constructed from wood, particleboard, or metal, however, are often relatively heavy and this may make the table awkward or difficult to move. Tabletops constructed from wood or metal are also relatively expensive and these types of tabletops must generally be treated or finished before use. For example, tabletops constructed from wood must generally be sanded and painted, and metal tabletops must be formed into the desired shape and painted. In addition, because wooden and metal tabletops are relatively heavy, the cost of shipping and transportation of the tables may be increased. The weight of the tabletop may also make the tables more difficult to move and store.

In order to decrease the weight of conventional tables, tabletops may be constructed from relatively lightweight materials such as plastic. Tabletops constructed from lightweight materials, however, may require large reinforcing members or other structural parts such as braces, brackets, supports, and the like to strengthen the tabletop. While these additional parts may increase the strength of the tabletop, the added parts may also increase the weight of the table. These additional parts may also result in increased manufacturing costs and require additional time to assemble the table. In addition, extra fasteners may be required to assemble and connect these parts to the table, which may require extra time and labor during the manufacturing process. The additional parts and fasteners may further increase the cost of the table and make the table more difficult to manufacture.

Conventional tables may include a frame connected to the tabletop. The frame may include a pair of side rails connected to sides of the tabletop using fasteners. Multiple fasteners may be required to securely connect the frame to the tabletop. When a large load or force is applied to some known tables, the frame may bend or deform. In addition, a large load or force may cause the fasteners used to connect the frame to the tabletop to detach or separate from the tabletop. The fasteners may damage and/or tear through the tabletop if the load or force exceeds a certain amount.

The tabletops of some known tables may be damaged if a relatively large load or force is applied. For example, a portion of the tabletop may bend or deform if a large load or force is applied to the tabletop. For instance, if a load or force is applied to an outer portion of the tabletop, the outer portion of the tabletop may bend or deform. The outer portion of the tabletop may also be dented, pushed in, gouged, or broken if an excessive force is applied.

BRIEF SUMMARY

A need therefore exists for a table that eliminates or diminishes the above-described disadvantages and problems.

One aspect is a structure that may be at least partially constructed from plastic. For example, the structure may be at least partially constructed from molded plastic. If desired, all or a portion of the structure may be constructed from blow-molded plastic.

Another aspect is a structure that may include a generally planar portion. For example, the structure may be a tabletop and the tabletop may include a generally planar portion. For instance, the tabletop may have a generally planar upper portion or surface, and/or a generally planar lower portion or surface. The tabletop may also include projecting or protruding structures, such as a lip. The lip may extend downwardly relative to the lower portion of the tabletop, and the lip may be disposed about an exterior of the tabletop. The lip may extend about all or a portion of the tabletop, and the lip may form at least a portion of a sidewall or outer edge of the tabletop. The lip may also be spaced inwardly from the outer portion of the tabletop. The lip may have a generally constant height, but the height of the lip may vary. The lip and the tabletop may be integrally formed during a molding process as part of a unitary, one-piece construction. For convenience and readability, the structure disclosed in this application will be generally described in connection with an exemplary tabletop. One of skilled in the art will appreciate, after reviewing this disclosure, that the structure could be other suitable articles, constructions, devices, and the like. For example, the structure could be articles of furniture, sporting goods, sheds, storage containers, etc. The structure could also be various parts and pieces, such as furniture components and the like.

Still another aspect is a tabletop may a lip, and the lip may include an outer wall and an inner wall. The outer wall of the lip may form at least a portion of an outer edge of the tabletop. The outer wall and the inner wall may be disposed in a generally parallel configuration, and a portion of the outer wall and the inner wall may be separated by a distance. A portion of the outer wall and the inner wall may also touch or contact. In an exemplary embodiment, the distal portion of the outer wall and the inner wall (e.g., the lower portion of the lip) may touch or contact, and the distal portion of the lip may have a compression edge. The compression edge may be relatively high-strength, and durable. The compression edge may have increased structural integrity because it may have a double wall thickness. The compression edge may have a height generally equal to about fifty percent (50%) of a height of the lip. The compression edge may also be larger or smaller. For example, the compression edge may be greater than about fifty percent (50%) of the height of the lip, such as about sixty percent (60%), about seventy percent (70%), about eighty percent (80%), about ninety percent (90%), or more. The compression edge may have a height less than about fifty (50%) of the height of the lip, such as about forty percent (40%), about thirty percent (30%), about twenty percent (20%), about ten percent (10%), or less. The compression edge may have a generally uniform height, and the compression edge may extend about all or at least a portion of the tabletop. The compression edge may have a generally uniform area of contact between the inner wall and the outer wall of the lip. Advantageously, if the compression edge has a generally uniform size, shape, configuration, and/or arrangement, the compression edge may have generally uniform properties and characteristics. This may allow at least a portion of the tabletop, such as the outer perimeter and/or lower portion of the lip, to have generally uniform properties and characteristics.

Yet another aspect is a tabletop that may include one or more supports, and the supports may be disposed in the inner wall of the lip. The supports may be formed by a portion of the inner wall of the lip, and the supports may extend inwardly towards a center portion of the tabletop. The supports may include an upper portion connected to the lower surface of the tabletop, and the supports may include a lower portion disposed towards a distal end of the lip. The supports may have a height that may be measured from the lower surface of the tabletop to the lower portion of the support, and the supports may have a generally constant height. The height of the supports may be generally equal to about fifty percent (50%) of a height of the lip. The supports may also be larger or smaller. For example, the supports may have a height greater than about fifty percent (50%) of the height of the lip, such as about sixty percent (60%), about seventy percent (70%), about eighty percent (80%), about ninety percent (90%), or more. The supports may have a height less than about fifty (50%) of the height of the lip, such as about forty percent (40%), about thirty percent (30%), about twenty percent (20%), about ten percent (10%), or less. The supports may have generally uniform construction, such as a generally uniform height, width, and/or thickness. Additionally, the supports may have a generally consistent size, shape, configuration, and/or arrangement. In an exemplary embodiment, one or more of the supports may be disposed in a pattern, and the pattern may include a plurality of supports disposed in an order, grouping, and/or array. The pattern may extend about all or at least a portion of the tabletop. For example, a first portion of the tabletop, such as a first side, may include a first plurality of supports disposed in a pattern. A second portion of the tabletop, such as a second side, may include a second plurality of supports disposed in a pattern. In an exemplary embodiment, the pattern on the first side of the tabletop may be symmetrical, the same, or a minor image of the pattern on the second side of the tabletop. The pattern may include one or more supports disposed in a generally consistent arrangement or layout. The pattern may also include one or more supports disposed in a regular or repeating order, and one or more of the supports may be disposed in a balanced or even formation. The supports may have generally uniform properties and characteristics because the supports may have generally uniform shapes, sizes, configurations, and/or arrangements. The tabletop may have generally uniform properties or characteristics because the supports may have generally uniform shapes, sizes, configurations, and/or arrangements, and the supports may be disposed in a generally uniform and constant pattern.

Still yet another aspect is a tabletop that may include one or more attachment portions, and the attachment portions may be sized and configured to facilitate attachment of the frame to the tabletop. The attachment portions may be formed by and/or disposed in the inner wall of the lip, and the attachment portions may have generally the same height and width. In an exemplary embodiment, the attachment portions may have generally the same height as the supports. The width of the attachment portions, however, may be larger or smaller than the width of the supports. For example, the attachment portions may have a width that is about twice as large as a width of the supports. The attachment portions may also have a larger width, such as about three times, about four times, about five times, or more that the width of the supports. The attachment portions may also have a smaller width, such as about one-half the width of the supports.

The attachment portions may facilitate attachment of a frame to the tabletop. For instance, if the frame is attached to the tabletop by one or more fasteners, such as screws, the attachment portions may be sized and configured to receive a portion of the fastener. The attachment portions may have generally uniform sizes, shapes, configurations, and/or arrangements, which may create attachment portions with generally uniform properties and characteristics. The generally uniform size, shape, configuration, and/or arrangement of the attachment portions may allow at least a portion of the tabletop, such as the outer perimeter or lip, to have generally uniform properties and characteristics.

A further aspect is a tabletop that may include one or more joints, couplings, or connections disposed in and/or formed by the inner wall of the lip. The joints may include a portion of the inner wall of the lip disposed at least proximate a portion of the outer wall of the lip. In an exemplary embodiment, a portion of the inner wall may contact or touch the outer wall of the lip to form the joint. The joint may extend from the lower portion of the tabletop to the distal portion of the lip and, as discussed above, the distal portion of the lip may be a compression edge. The joints may be disposed in a generally parallel configuration, and the joints may be spaced apart by a generally constant distance. The joints may have a generally uniform height, width, and/or area of contact between the inner wall and the outer wall of the lip. Advantageously, if the joints have a generally uniform size, shape, configuration, and/or arrangement, the joints may have generally uniform properties and characteristics. This may allow at least a portion of the tabletop, such as the lip, to have generally uniform properties and characteristics.

In an exemplary embodiment, a joint may be disposed on each side of a support. If a plurality of supports is aligned, a joint may be disposed between adjacent supports. The joints and the supports may have generally the same height, and the joints and the supports may be disposed in a generally uniform pattern. If the joints and supports are disposed in a pattern with generally consistent sizes, shapes, configurations, and/or arrangements, at least a portion of the tabletop may have generally uniform properties and characteristics.

Another further aspect is a tabletop that may include a pattern of supports, joints, and/or attachment portions. For example, the pattern may include a series of generally aligned supports. The pattern may also include a joint disposed between each of the adjacent supports and/or a joint disposed on each side of the supports. In addition, the pattern may include one or more attachment portions. For instance, a number of supports and joints may be disposed in a row or line, and one or more attachment portions may be disposed in the row or line. The pattern may be symmetrically disposed on one or more of the sides and/or ends of the tabletop. The pattern may include an attachment portion disposed towards or proximate an end of the tabletop and one or more supports may be disposed on one or both sides of the attachment portion. The attachment portion and the supports may be separated by a generally equal distance, and the attachment portion and the supports may be separated by a joint. Depending upon the size of the tabletop, for example, additional attachment portions may be disposed towards a middle portion of the tabletop.

Advantageously, one or more of the supports, joints, and/or attachment portions in the pattern may have generally the same size, shape, configuration, and/or arrangement. For example, the supports, joints, and/or attachment portions may have generally the same height, and the support and the attachment portions may extend inwardly generally the same amount and/or have generally the same thickness. Because the supports, joints, and/or attachment portions may have generally the same height and may be disposed in a generally uniform pattern, the tabletop may have generally uniform properties and characteristics.

A still further aspect is a tabletop that may be a unitary, one-piece structure. For example, the tabletop may include one or more supports, joints, and/or attachment portions, and each of these components may be integrally formed with the tabletop as part of a unitary, one-piece structure.

Yet another further aspect is the tabletop may include a volume or hollow interior portion. The hollow interior portion may be at least partially disposed between an upper surface and a lower surface of the tabletop. The supports may be connected to the lower surface of the tabletop, and the supports may include a volume or a hollower interior portion. The hollow interior portion of the tabletop may be connected to and/or in fluid communication with the hollow interior portion of the supports.

Still yet another further aspect is the tabletop may include one or more attachment portions, and the attachment portions may include a volume or hollow interior portion. The upper portion of the attachment portions may be connected to the lower surface of the tabletop. The hollow interior portion of the tabletop may be connected to and/or in fluid communication with the hollow interior portion of the attachment portions.

A still further aspect is a tabletop may include one or more joints and the joints may at least partially, at least substantially, and/or entirely prevent direct fluid communication between adjacent structures, such as between adjacent supports. One or more of joints may at least partially, at least substantially, and/or entirely prevent direct fluid communication between the attachment portion and adjacent structures, such as between the attachment portion and adjacent supports.

A further aspect is a tabletop that may include generally uniform properties and characteristics. For example, one or more of the supports, joints, and/or attachment portions may include an end, such as a proximal end, and the end may be disposed proximate or connected to a lower surface of the tabletop. In addition, the supports, joints, and/or attachment portions may have a height that is generally the same. The supports and attachment portions may also have a thickness that is generally the same. The supports, joints, and/or attachment portions may have a distal end, and the distal end may be disposed at least proximate and/or connected to the distal portion of the lip, which may be a compression edge. The supports, joints, attachment portions, and/or compression edge may have generally consistent sizes, shapes, configurations, and/or arrangements, which may allow at least a portion of the tabletop, such as the outer perimeter or lip, to have generally uniform properties and characteristics.

Another aspect is a tabletop that may include a pattern, and at least a portion of the pattern may be disposed in a generally uniform or regular arrangement. For example, the pattern may include one or more supports, joints, attachment portions, and/or compression edges. The pattern may repeat along one or more sections of the tabletop, such as along inner surface of the lip. In an exemplary embodiment, the pattern may be disposed along at least a portion of one or more sides and/or ends of the tabletop. For example, the pattern may have a length generally equal to or less than a length of a siderail of the frame. The pattern may also extend about at least a portion of the perimeter, such more than about fifty percent (50%) of the perimeter, more than about sixty percent (60%) of the perimeter, more than about seventy percent (70%) of the perimeter, more than about eighty percent (80%) of the perimeter, more than about ninety percent (90%) of the perimeter, or more. The pattern may be disposed in one or more corners of the tabletop, or a different pattern may be disposed in one or more corners or different sections of the tabletop. The corners, ends, or other portions of the tabletop, however, may not include the pattern. In addition, portions of the tabletop, such as the ends and/or corners, may not include supports, joints, attachment portions, and/or compression edge. After reviewing this disclosure, one skilled in the art will appreciate that the tabletop may include any suitable number of supports, joints, attachment portions, and/or compression edges, and none of these structures may be required. For example, the attachment portions may not be required if the table does not include a frame or if the frame is attached to other portions of the tabletop. In addition, one skilled in the art will appreciate after reviewing this disclosure that the tabletop may include other components, features, aspects, and the like.

Another aspect is the molded plastic structure may be constructed from blow-molded plastic and the lip may be integrally formed during the blow-molding process as part of a unitary, one-piece construction. For example, during the blow-molding process, gas may flow through the hollow interior portions of the tabletop, supports, and/or attachment portions. In an exemplary embodiment, the gas may have sufficient pressure to form the lip, supports, joints, attachment portions, and/or compression edge during the blow-molding process.

Advantageously, the supports, joints, attachment portions, and/or compression edge may help create a lip that is high-strength, impact resistant, and aesthetically pleasing. The supports, joints, attachment portions, and/or compression edge may also help create a tabletop with generally uniform properties and characteristics. In addition, a relatively small number of attachment portions may be required. For example, a tabletop with a length of about seventy-two (72) inches may include two, three, four, or more attachment portions along the length. It will be appreciated, after reviewing this disclosure, that the table may include any suitable number, size, shape, configuration, and/or arrangement of supports, joints, attachment portions, and/or compression edges depending, for example, upon the intended use of the table.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of exemplary embodiments to further illustrate and clarify the above and other aspects, advantages, and features of the present invention. It will be appreciated that these drawings depict only exemplary embodiments of the invention and are not intended to limit its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

FIG. 5 is an enlarged cross-sectional side view of a portion of an exemplary tabletop, illustrating an exemplary frame connected to an exemplary attachment portion;

DETAILED DESCRIPTION OF SOME EMBODIMENTS

The following exemplary embodiments of a molded plastic structure are generally described in connection with tables and tabletops. The principles of the present invention, however, are not limited to tables or tabletops. The principles of the present invention may be implemented in other articles of furniture, structures, devices, and the like. For example, the present invention may be implemented with chairs, benches, picnic tables, storage containers, sheds, deck boxes, coolers, garden boxes, playground equipment, etc. In addition, it will be understood that, with the benefit of the present disclosure, the molded plastic structures can have a variety of shapes, sizes, configurations, and arrangements. Moreover, while the tables and tabletops shown in the accompanying figures may be configured for use in connection with banquet or utility tables, it will be appreciated the tables and tabletops may have other styles or configurations. For instance, the tables and tabletops could be implemented in connection with round tables, personal tables, conference tables, seminar tables, folding tables, recreation tables, adjustable height folding tables, card tables, and the like.

To assist in the description of exemplary embodiments of the tables and tabletops, words such as top, bottom, front, rear, right, and left may be used to describe the accompanying figures which may be, but are not necessarily, drawn to scale. It will further be appreciated the tables and tabletops can be disposed in a variety of desired positions, orientations, and arrangements; and the tables and tabletop may be used in numerous locations, environments, and settings. A detailed description of some exemplary embodiments now follows.

Figure 1A:
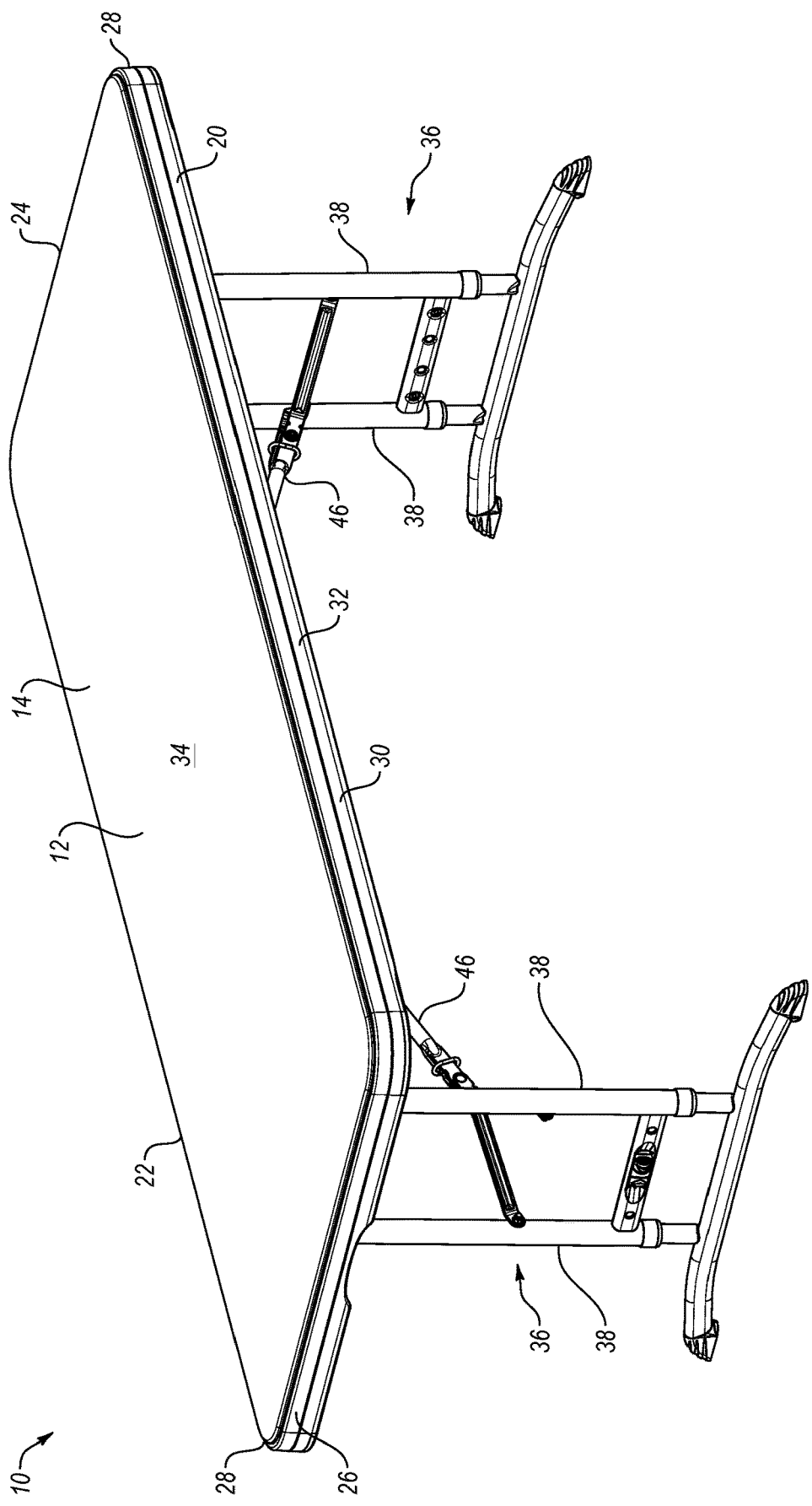
FIG. 1A is an upper perspective view of an exemplary table.
Figure 1B:
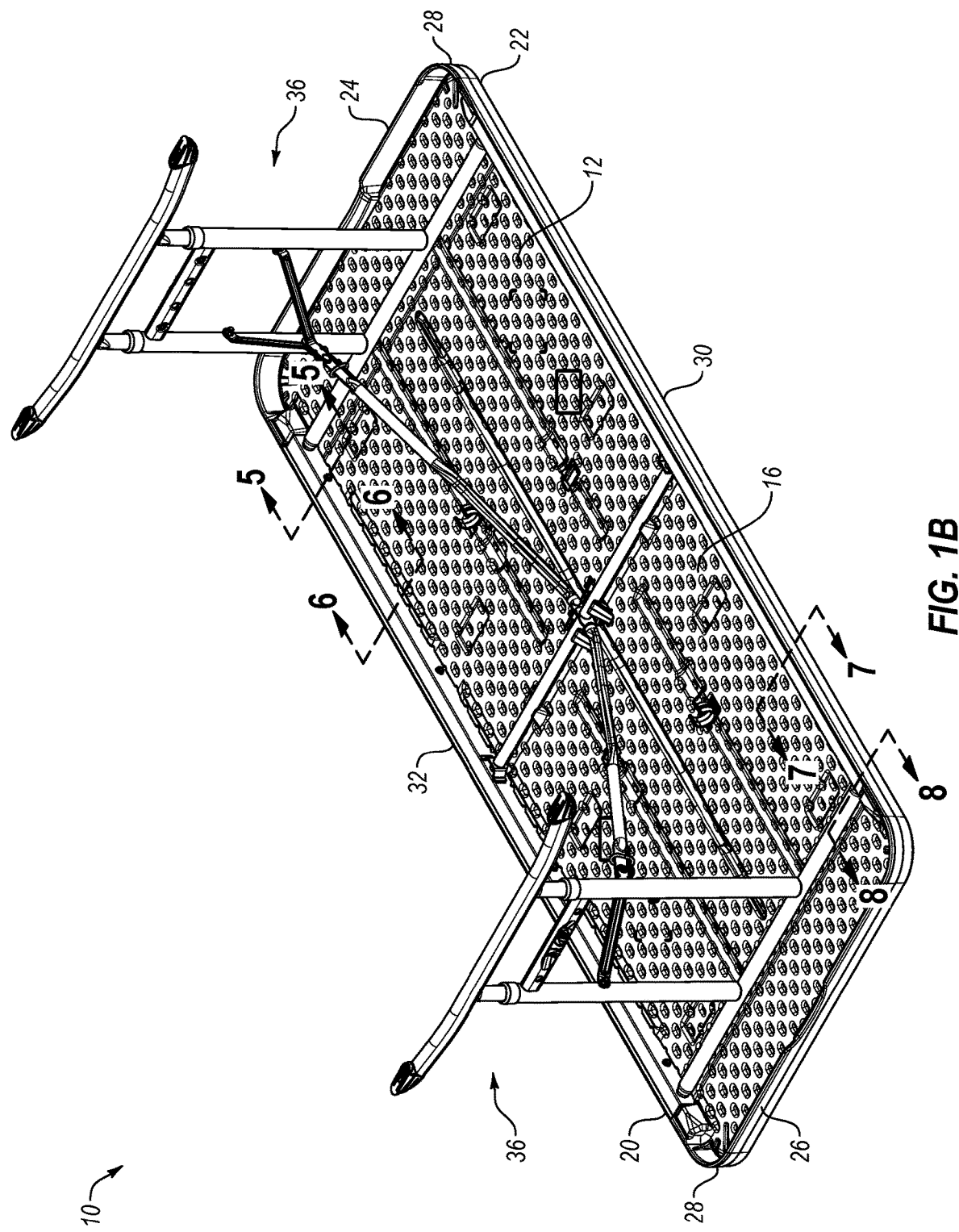
FIG. 1B is a lower perspective view of the exemplary table.

As shown in FIGS. 1A and 1B, an exemplary table 10 may include a tabletop 12 and the tabletop 12 may be constructed from molded plastic. The tabletop 12 may include an upper portion 14, such as an upper surface, and a lower portion 16, such as an underneath or lower surface. The upper portion 14 may be spaced apart from the lower portion 16 of the tabletop 12 by a distance, which may be a generally constant distance in some embodiments. The tabletop 12 may also include a hollow interior portion 18, such as a volume, disposed between the upper portion 14 and the lower portion 16 of the tabletop 12.

The tabletop 12 may include one or more sides and/or ends, such as a first side 20, a second side 22, a first end 24, and a second end 26. The tabletop 12 may include one or more corners 28. The tabletop 12 may include a lip 30, and the lip 30 may be disposed at least proximate an outer perimeter 32 of the tabletop 12. The lip 30 may also be spaced inwardly from the perimeter 32, and the lip 30 may have different heights, sizes, shapes, configurations, and/or arrangements. For example, the lip 30 may be disposed along the sides 20, 22, ends 24, 26, and/or corners 28 of the tabletop 12. If the tabletop 12 is constructed from a moldable material such as plastic, the tabletop 12, the upper portion 14, the lower portion 16, the hollow interior portion 18, the sides 20, 22, the ends 24, 26, the corners 28, and/or the lip 30 may be integrally formed as part of unitary, one-piece structure during the molding process. If the tabletop 12 is constructed from plastic, and the tabletop 12 may be formed by blow-molding, injection molding, rotary molding, and the like. The molded plastic tabletop 12 may be constructed from materials such as high-density polyethylene (HDPE) or another suitable polymers or plastics. The tabletop 12 may also be constructed using various materials such as wood, metal, non-plastic materials, plant-based materials, and the like. The tabletop 12 may be constructed using other processes and methods depending, for example upon the material used to construct the tabletop 12.

The tabletop 12 may include a center portion or body 34, and at least a portion of the center portion 34 may have a generally planar configuration. For example, the center portion 34 may include a generally planar upper portion or surface 14 and/or a generally planar lower portion or surface 16. The lip 30 may extend downwardly and/or outwardly relative to the upper portion 14, the lower portion 16, and/or the center portion 34 of the tabletop 12. As shown in the accompanying figures, the lip 30 may extend around an entirety of the perimeter 32 of the tabletop 12. In other exemplary embodiments, the lip 30 may extend along one or more portions of the tabletop 12, and the lip 30 may include one or more sections.

The table 10 may include a one or more support structures 36, and the support structures 36 may be sized and configured to support the tabletop 12 above a surface such as the floor or ground. The support structures 36 may include one or more legs 38, and the support structures 36 may be movable between an extended or use position and a collapsed or storage position relative to the tabletop 12. As shown in the accompanying figures, the support structures 36 may include a pair of legs 38, and the support structures 36 may be height adjustable. The support structures 36 and/or legs 38 may have different shapes, sizes, configurations, and/or arrangements depending, for instance, upon the intended use of the table 10. For example, the table 10 may include support structures, legs, or other aspects or features such as shown in U.S. Pat. No. 10,470,561 and U.S. Patent Publication Nos. 20190150608 and 20200077785, each of which is incorporated by reference in its entirety.

The table 10 may include a frame 40 that is connected to the tabletop 12, and the frame 40 may include one or more rails, such as a first siderail 42 and a second siderail 44. The first siderail 42 may be disposed at least proximate the first side 20 of the tabletop 12, and the second siderail 44 may be disposed at least proximate the second side 22 of the tabletop 12. The first and second siderails 42, 44 may extend along a length of the tabletop 12, and the siderails 42, 44 may help support the tabletop 12. If the table 10 is a fold-in-half table, then a first portion of the first side rail 42 may be connected to a first portion of the tabletop 12 and a second portion of the first side rail 42 may be connected to a second portion of the tabletop 12. Similarly, a first portion of the second side rail 44 may be connected to a first portion of the tabletop 12 and a second portion of the second side 44 rail may be connected to a second portion of the tabletop 12. The first and second portions of the first side rail 42 may be connected by a hinge, and the first and second portions of the second side rail 44 may be connected by a hinge. Exemplary fold-in-half table are shown in U.S. Pat. Nos. 7,278,361 and 8,555,791, each of which is incorporated by reference in its entirety.

The support structures 36 may be connected to the frame 40. For instance, the support structures 36 may be rotatably connected to the first and second siderails 42, 44 of the frame 40. The support structures 36, however, do not have to be connected to the first and second siderails 42, 44 and/or the frame 40. Instead, the support structures 36 may be connected to any suitable portions of the tabletop 12 and/or table 10. It will also be appreciated that the table 10 may include any suitable number and type of support structures 36 and/or legs 38 depending, for example, upon the intended use of the table 10. In addition, it will be appreciated that the frame 40, the first siderail 42, and/or the second siderail 44 may have various sizes, shapes, configurations, and arrangements. It will further be appreciated that the support structures 36, the legs 38, the frame 40, the side rails 42, 44, and other components, aspects, and features are not required; and the table 10 may have other components, aspects, and features.

The support structures 36 may be connected to other portions of the tabletop 12 and/or frame 40. For instance, one or more braces 46 may be connected to the support structures 36, and the braces 46 may be connected to other portions of the table 10 and/or frame 40, such as a center crossbar 48.

The table 10 may be sized and configured to be stacked with one or more additional tables. In the stacked configuration, the tables 10 may be nested together to reduce a height of the stacked tables 10. Reduction in the height may allow the tables 10 to be shipped, stored, and transported in a smaller volume. This may result in significant cost savings because, for example, less storage space may be required and a substantial reduction in transportation costs may be achieved. The table 10 may be stackable and/or may include one or more features, aspects, components, and the like as shown and described in U.S. Pat. Nos. 8,347,795; 8,397,652; 8,408,146; 8,622,007; and 9,138,050; each of which is incorporated by reference in its entirety.

As shown in FIG. 1B, the siderails 42, 44 of the frame 40 may be disposed at least proximate the lip 30 and/or the perimeter 32 of the tabletop 12. For example, the first side rail 42 may be disposed along the first side 20 of the tabletop 12, and the second side rail 44 may be disposed along the second side 22 of the tabletop 12. Advantageously, if the side rails 42, 44 are disposed proximate the sides 20, 22 of the tabletop 12, then the sides of the tabletop 12 may be supported by the frame 40, which may help create a strong and sturdy table 10. In addition, the siderails 42, 44 may be sized and configured to directly support one or more portions of the lip 30. For example, a first portion of the siderails 42, 44 may support a first portion of the lip 30, and a second portion of the siderails 42, 44 may support a second portion of the lip 30. Because the lip 30 may be supported by the siderails 42, 44 in more than one position, the lip 30 may be strong, sturdy, and held in a generally fixed position. In addition, the lip 30 may be supported such that the lip 30 does not undesirably bend or flex. The lip 30 may also be less likely to be damaged, dented, or deformed because the lip 30 may be supported in multiple locations by the siderails 42, 44 of the frame 40.

The frame 40 may also help prevent the tabletop 12 from being damaged when a large load or force is applied to the table 12. For instance, if the table 10 is dropped or knocked over, the support of the lip 30 by the frame 40 may help prevent damage to the tabletop 12. In addition, the frame 40 may allow the tabletop 12 to receive and/or support large loads or forces without the tabletop 12 being dented, crushed, deformed, or otherwise damaged. Further, because the frame 40 may directly support the lip 30, that may facilitate stacking of the tables 10 because additional tables 10 may be disposed in the stacked configuration, and the tables 10 may be less likely to be damaged by sudden impacts.

In an exemplary embodiment, a first portion of the lip 30, such as the portion of the lip 30 proximate the tabletop 12, such as the upper surface 14 and/or the lower surface 16 of the tabletop 12, may be referred to as an upper or proximal portion 50 of the lip 30. The siderails 42, 44 of the frame 40 may directly support the proximal portion 50 of the lip 30. A second portion of the lip 30, such as the lower portion of the lip 30, may be referred to as the lower or distal portion 52 of the lip 30. The distal portion 52 of the lip 30 may be directly supported by the siderails 42, 44 of the frame 40.

The lip 30 may include an inner wall 54 and an outer wall 56, and the lip 30 may have a thickness that may be measured between the inner and outer walls 54, 56. The proximal and distal portions 50, 52 of the lip 30 may have similar or different thicknesses. For example, the proximal portion 50 of the lip 30 may have a larger thickness than the distal portion 52 of the lip 30. The proximal portion 50 of the lip 30 may also have a smaller thickness than the distal portion 52 of the lip 30, or the proximal and distal portions 50, 52 of the lip 30 may have the same thickness.

As shown in FIG. 1B, the tabletop 12 may include one or more depressions 60, which may also be referred to as tack-offs. The depressions 60 may be sized, shaped, configured, and/or arranged to provide increased strength, stiffness, and/or rigidity to the tabletop 12. The depressions 60 may cover a majority, substantially all, or the entirety of the lower portion 16 of the tabletop 12. In addition, the depressions 60 may have a generally uniform shape, size, configuration, and/or arrangement. The depressions 60 may have an elongated shape, which may be aligned with an axis, and the depressions 60 may be disposed in one or more rows and/or columns. For example, the depressions 60 may be aligned in rows that extend along a length of the tabletop 12, and the depressions 60 may be disposed in columns that extend along a width of the tabletop 12. The depressions 60 in adjacent rows and/or columns may be offset, and the distance between adjacent depressions in the rows and/or columns may be generally the same. In an exemplary embodiment, the distance between adjacent depressions in the rows and/or columns may be generally constant or equidistant. The distance between adjacent rows and/or columns may also be generally constant or equidistant.

The depressions 60 may be used to create a tabletop 12 with generally uniform characteristics or qualities. For example, if the depressions 60 are generally consistently spaced, that may allow the upper portion 14 of the tabletop 12 to be uniformly supported. In addition, if the depressions 60 are separated by a generally constant distance, which may be measured from a center of one depression 60 to a center of an adjacent depression 60, that may create a tabletop 12 with generally uniform characteristics or qualities. The distance between adjacent depressions 60 may be measured longitudinally, laterally, or at an angle depending, for example, upon the arrangement of the depressions 60.

The depressions 60 may also be disposed in a pattern and the depressions may be generally aligned and/or disposed in predetermined locations within the pattern. The pattern may include, for example, a number of rows and/or columns of the depressions 60. The depressions 60 may also be disposed in other suitable forms and patterns, and the depressions 60 may have other shapes, sizes, configurations, and/or arrangements, depending, for example, upon the intended use of the tabletop 12.

The depressions 60 may have different characteristics depending, for example, upon the particular configuration of the depressions. For example, the depressions 60 may have a non-circular configuration, which may provide increased strength in one direction in comparison to another direction. Advantageously, if the depressions 60 have different characteristics, then the depressions can be arranged or configured so the structure has certain characteristics. In particular, the depressions 60 may be arranged into a pattern to maximize certain characteristics and/or create a structure with generally uniform characteristics. For instance, the pattern may include generally uniformly spaced depressions 60 that are separated by a generally constant distance and/or disposed in standardized arrangement. A consistent arrangement of the depressions 60 may help create a structure with uniform characteristics, such as generally uniform strength and structural integrity.

Figure 2A:
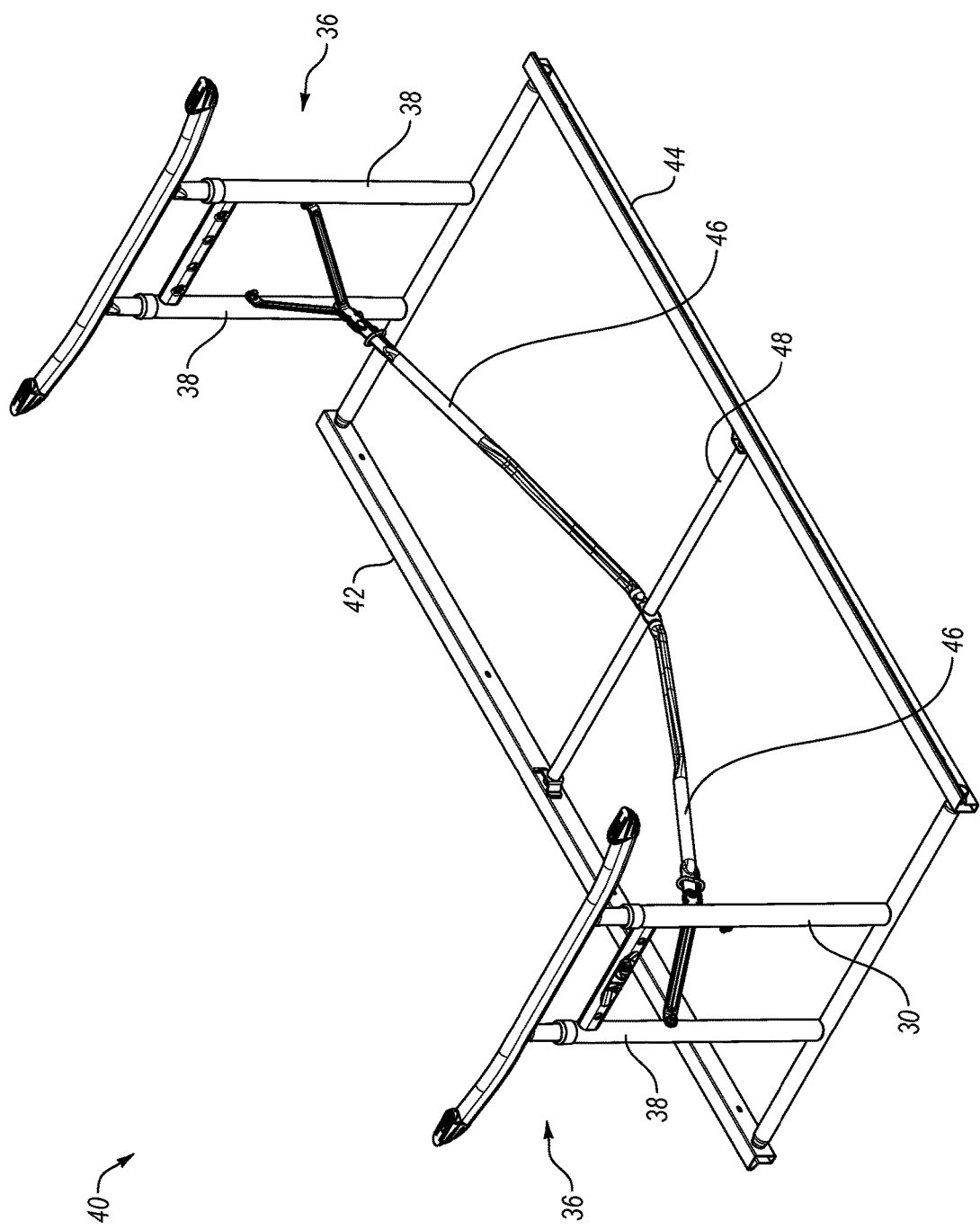
FIG. 2A is an upper perspective view of an exemplary frame.
Figure 2B:
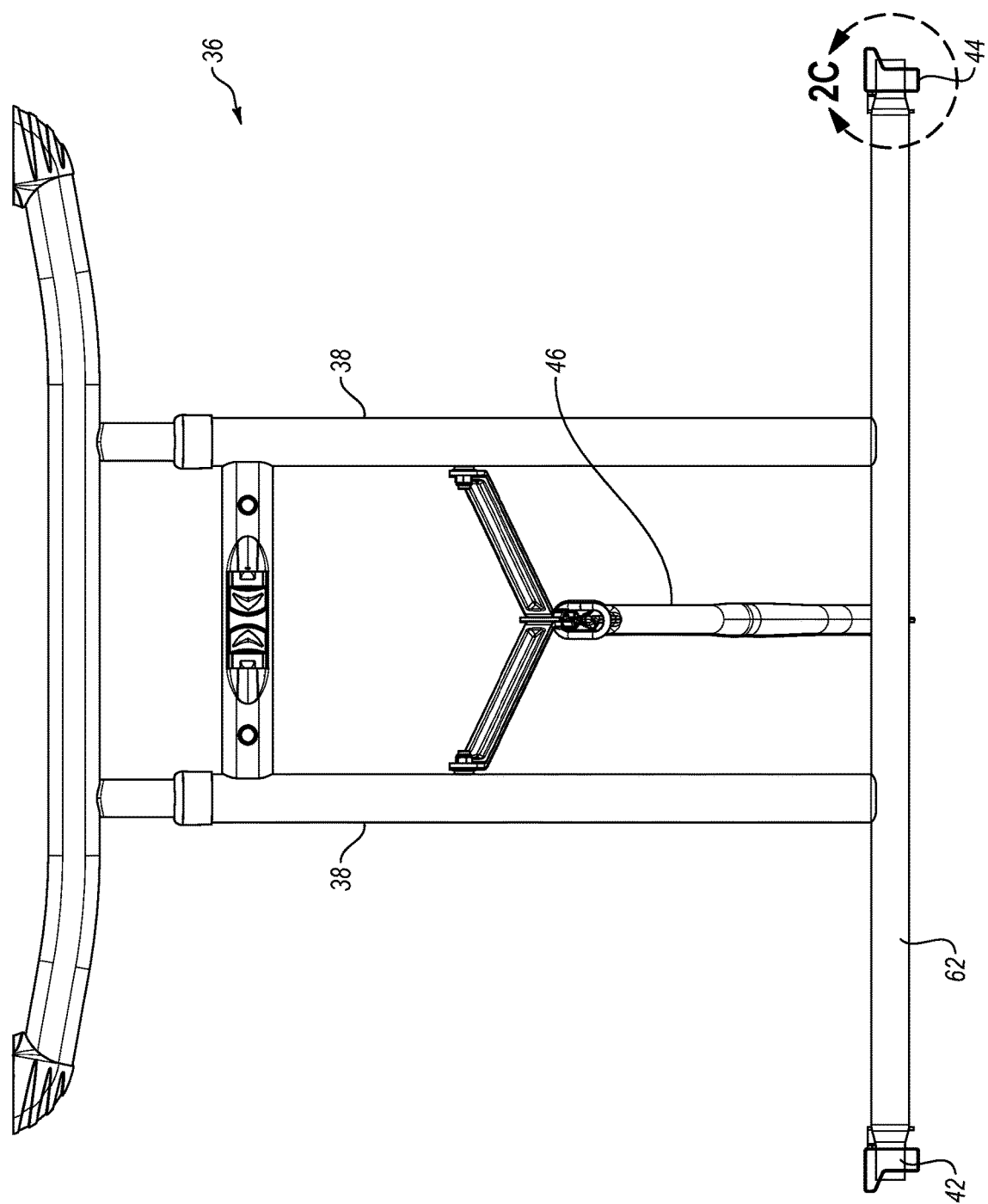
FIG. 2B is an end view of the exemplary frame.
Figure 2C:
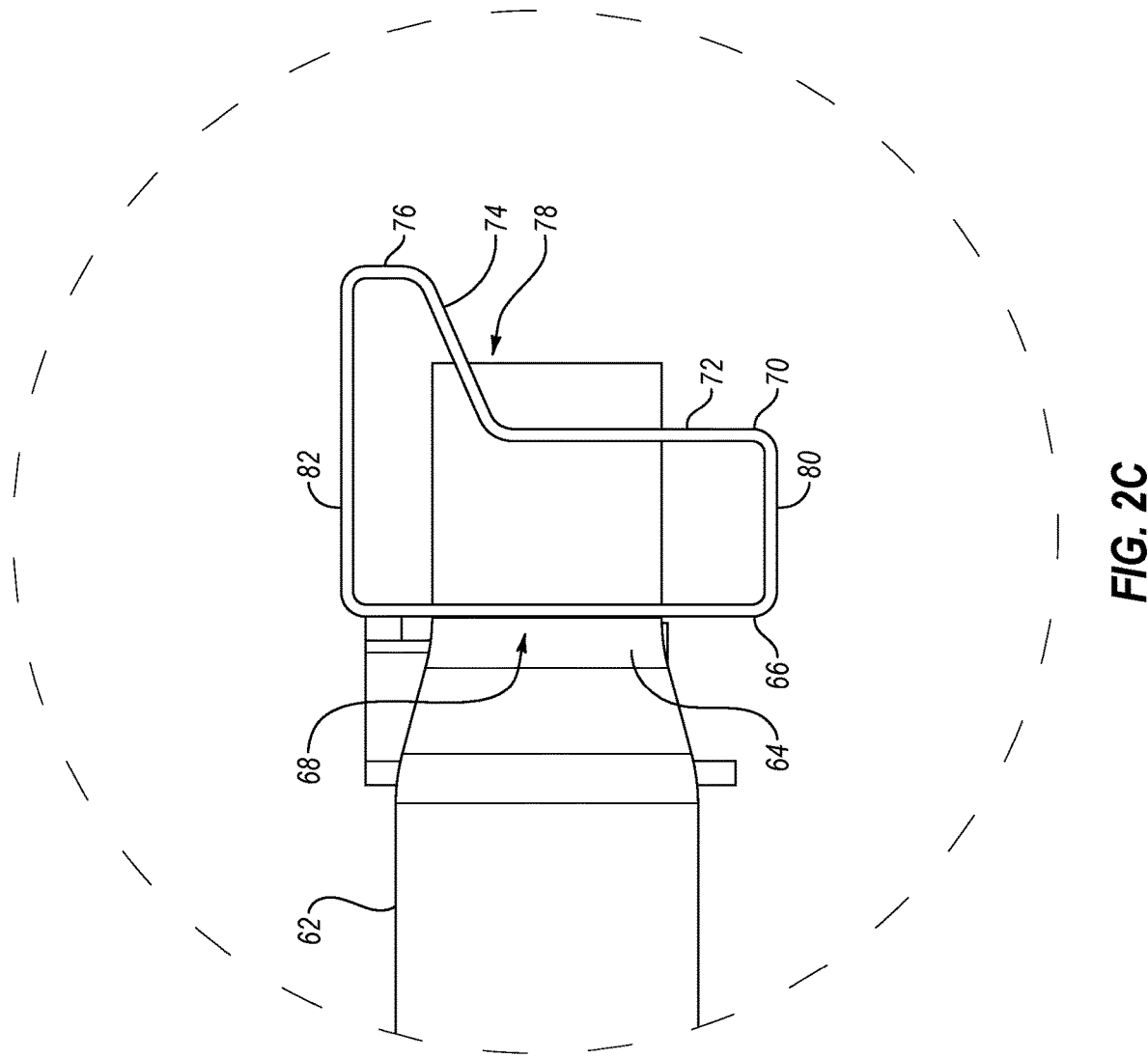
FIG. 2C is an enlarged view of a portion of the exemplary frame.

As shown in FIGS. 2A-2C, the support structures 36 may be connected to the frame 40 by one or more cross members 62. The cross members 62 may be part of the support structures 36, part of the frame 40, or independent components. The legs 38 may be securely or rotatably connected to the cross members 62, and the cross members 62 may be securely or rotatably connected to the frame 40. For example, as shown in FIG. 2C, an end of the cross member 62 may include a tapered section 64, and the tapered section 64 may be connected to the siderails 42, 44 of the frame 40. For instance, the siderails 42, 44 of the frame 40 may include a first side 66, which may be an inner surface or inner portion that is generally disposed towards the center portion 34 of the tabletop 12. The first side 66 of the siderail 42, 44 may have a generally planar configuration, and the first side 66 may include an opening or aperture 68 that facilitates connection of the cross member 62 to the frame 40. The siderails 42, 44 may include a second side 70, which may be an outer surface or outer portion that is generally disposed away from the center portion 34 and/or towards the lip 30. In an exemplary embodiment, the second side 70 may include multiple different segments, such as a first segment 72, a second segment 74, and a third segment 76. The first segment 72 may be disposed towards the upper portion 14 and/or lower portion 16 of the tabletop 12, and the third segment 76 may be disposed towards the lower or distal portion 52 of the lip 30. As shown in the accompanying figures, the first segment 72 and the third segment 76 may be disposed in generally parallel planes, and the second segment 74 may be disposed at an angle relative to the first segment 72 and/or the third segment 76. One or more of the segments 70, 72, 74 may include an opening or aperture 78 that facilitates connection of the cross member 62 to the frame 40. For example, the opening or aperture 78 may be disposed in a portion of the first segment 72 and the second segment 74, and the tapered section 64 of the cross member 62 may at least partially extend through the opening in the first and second segments 72, 74.

The siderails 42, 44 may include a first portion 80, such as an upper portion or surface, and the first portion 80 may be disposed at least proximate the lower portion 16 of the tabletop 12. In addition, the first portion 80 may be sized and configured to support the tabletop 12. The first portion 80 may be disposed in a receiving portion 84 in the lower portion 16 of the tabletop 12. The first portion 80 may be disposed at least proximate a connection or intersection of the lower portion 16 of the tabletop 12 and the lip 30. The siderails 42, 44 may include a second portion 82, such as lower portion or surface, and the lower portion 82 may be disposed at least proximate the distal portion 52 of the lip 30.

The first and second sides 66, 70 of the siderails 42, 44 may be separated by different distances. For example, the upper portion 80 of the siderails 42, 44 may have a smaller width than the lower portion 82 of the siderails 42, 44. For example, the width of the upper portion 80 of the siderails 42, 44 may be generally equal to or less than about ninety percent (90%) of the width of the lower portion 80, generally equal to or less than about eighty percent (80%) of the width of the lower portion 80, generally equal to or less than about seventy percent (70%) of the width of the lower portion 80, generally equal to or less than about sixty percent (60%) of the width of the lower portion 80, generally equal to or less than about fifty percent (50%) of the width of the lower portion 80, generally equal to or less than about forty percent (40%) of the width of the lower portion 80, generally equal to or less than about thirty percent (30%) of the width of the lower portion 80, generally equal to or less than about twenty percent (20%) of the width of the lower portion 80, generally equal to or less than about ten percent (10%) of the width of the lower portion 80, or less.

The siderails 42, 44 may be sized and configured to contact and/or support multiple portions of the tabletop 12. For example, the upper portion 80 of the siderails 42, 44 may be sized and configured to contact and/or support the lower portion 16 of the tabletop 12. One or more of the segments 72, 74, 76 of the siderails 42, 44 may be sized and configured to contact and/or support one or more portions of the inner portion 54 of the lip 30. For example, the first segment 72 of the side rails 42, 44 may be sized and configured to contact and/or support the proximal portion 50 of the lip 30, and the third segment 76 may be sized and configured to contact and/or support the distal portion 52 of the lip 30. Advantageously, because different portions of the lip 30 may be supported by different portions of the siderails 42, 44, the lip 30 may be securely supported and may not undesirably flex or bend. After reviewing this disclosure, one skilled in the art will appreciate that the lip 30 and the frame 40 may have other suitable shapes, sizes, configurations, and/or arrangements depending, for example, upon the intended use of table 10.

Figure 3A:
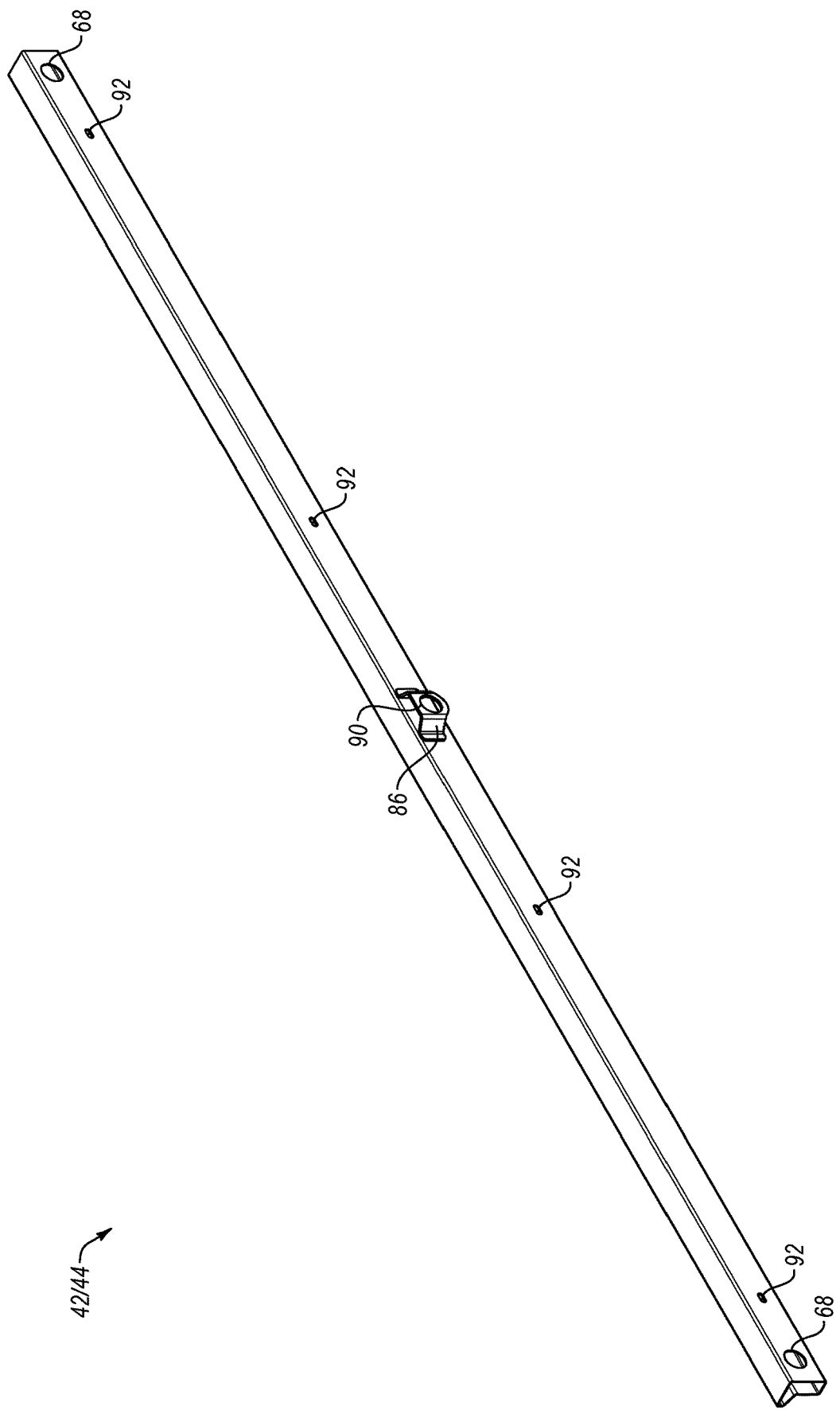
FIG. 3A is a perspective view of a portion of an exemplary frame, illustrating an exemplary siderail.
Figure 3B:
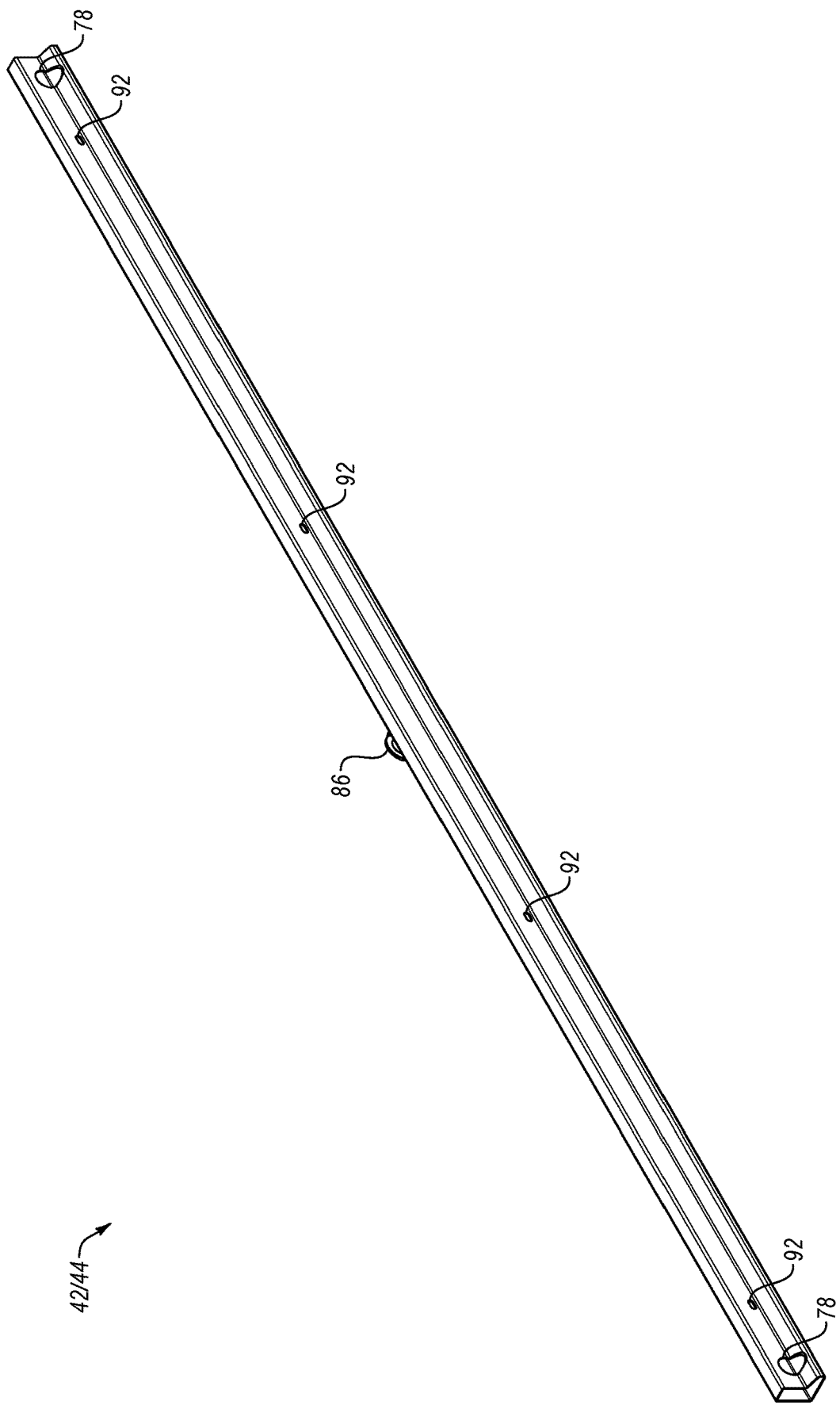
FIG. 3B is another perspective view of the portion of the exemplary frame.

As shown in FIGS. 3A and 3B, the siderail 42, 44 may have an elongated configuration, and the siderail 42, 44 may have a length that is generally equal to or less than a length of the tabletop 12. The siderail 42, 44 may include the openings 68, 78 that facilitate connection of the support structures 36 to the frame 40. As discussed above, the openings 68, 78 may be sized and configured to receive the tapered section 64 of the crossmember 62. The siderail 42, 44 may also include a bracket 86, and the bracket 86 may be disposed proximate a center or midpoint of the siderail 42, 44. The bracket 86 may facilitate connection of the center crossbar 48 to the frame 40. For example, the bracket 86 may include an opening or aperture 90, and an end of the center crossbar 48 may be disposed in the opening 90. In addition, the siderails 42, 44 may include one or more openings or apertures 92, and the openings 92 may be sized and configured to facilitate attachment of the siderails 42, 44 to the tabletop 12. For instance, the openings 92 may be sized and configured to allow a connector 94, such as a screw or fastener, to be inserted and the connector 94 may attach the siderail 42, 44 to the tabletop 12. After reviewing this disclosure, one skilled in the art will appreciate that the tabletop 12, the support structures 36, and the frame 40 may have various shapes, sizes, configurations, and/or arrangements, and these components may be connected using other structures, systems, and/or methods. It will also be appreciated that these components may be directly or indirectly connected.

Figure 4A:
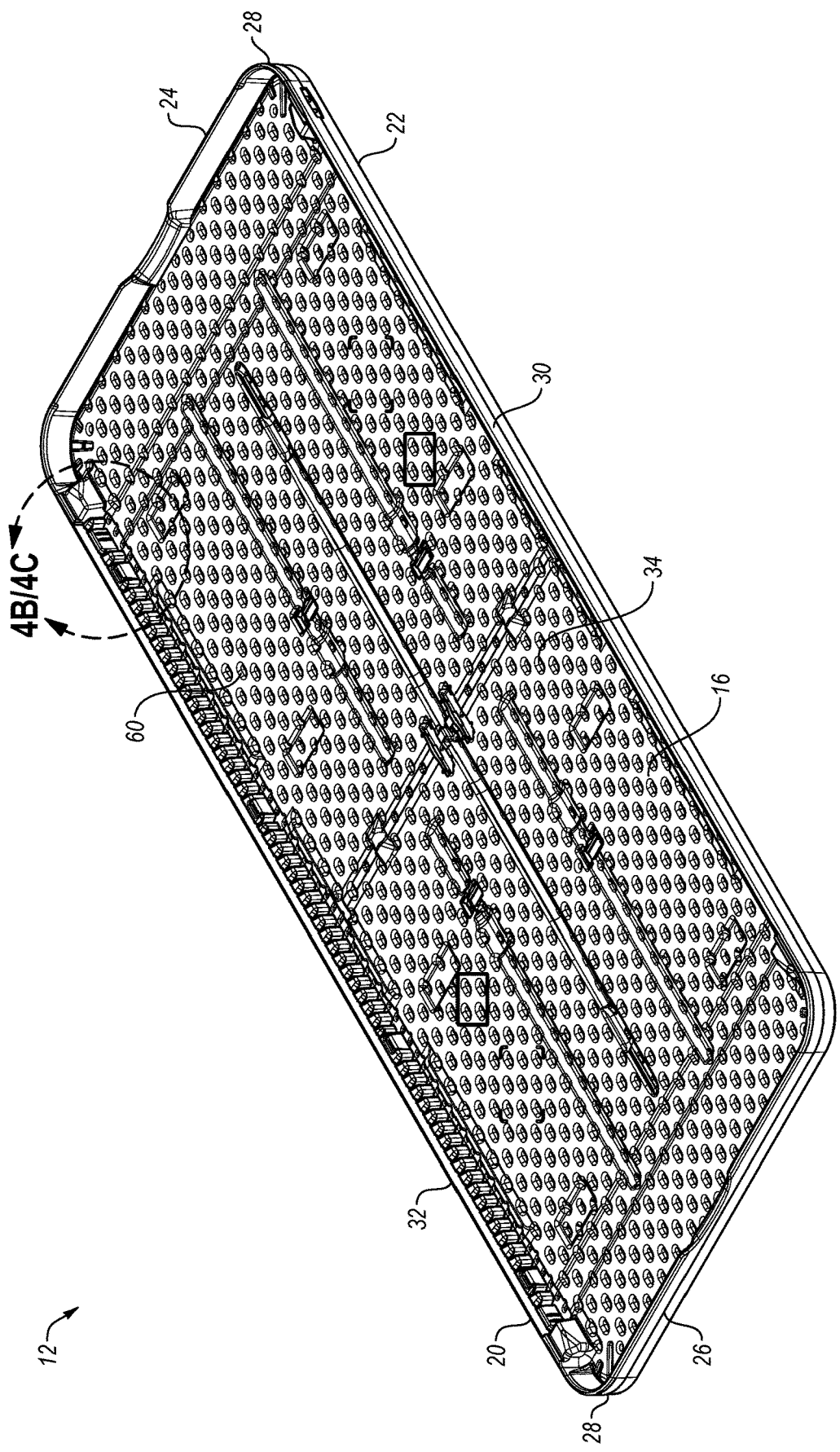
FIG. 4A is a lower perspective view of an exemplary tabletop.
Figure 4B:
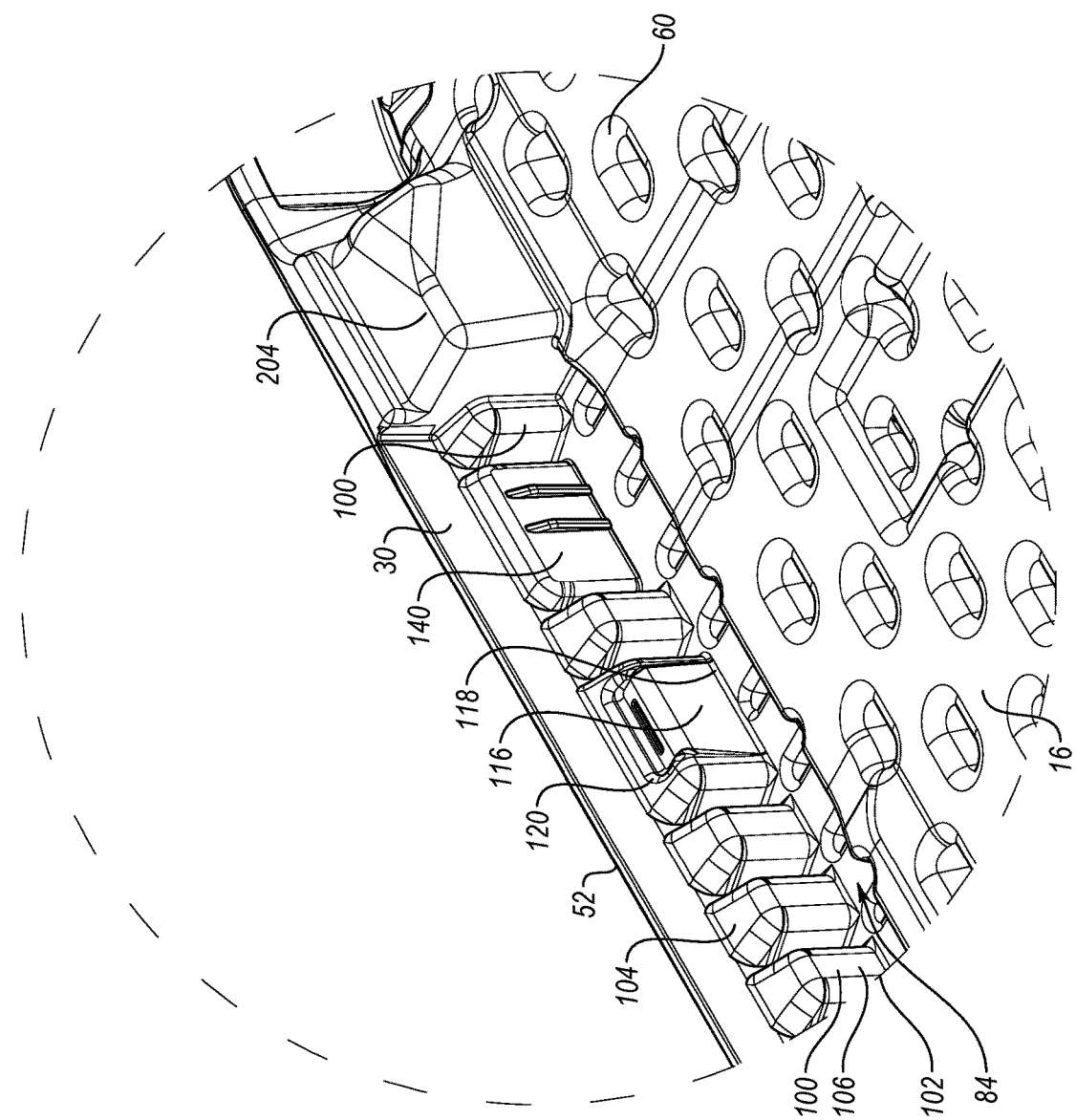
FIG. 4B is an enlarged perspective view of a portion of the exemplary tabletop.

As shown in FIGS. 4A and 4B, the lip 30 may be disposed about all or a portion of the perimeter 32 of the tabletop 12. The lip 30 may include one or more supports 100, and the supports 100 may be disposed in and/or formed by the inner wall 54 of the lip 30. The supports 100 may extend inwardly towards the central portion 34 of the tabletop 12. The supports 100 may also be connected to the lower portion 16 of the tabletop 12. In an exemplary embodiment, the supports 100 may be disposed at least proximate the intersection of the inner wall 54 of the lip 30 and the lower portion 16 of the tabletop 12. The supports 100 may be sized and configured to provide additional support to one or more portions of the tabletop 12 and/or the lip 30.

Advantageously, the supports 100 may increase the strength, rigidity, structural integrity, and/or impact resistance of the lip 30. The supports 100 may also reduce the likelihood that the tabletop 12 is damaged during use, shipping, and/or storage. For instance, the table 10 may be constructed and then shipped to a retailer or end user. During shipping, storage, and/or display of the table 10, the table 10 may be dropped, fall off a shelf, or otherwise be subject to large impacts. Items may also fall or crash into the table 10 during shipping, storage, and/or display. In addition, the table 10 may be subject to considerable movement, vibrations, forces, and the like while being shipped, stored, and/or displayed. These impacts and forces may damage one or more portions of the table 10, such as the edges of the tabletop 12. The supports 100 be sized and configured to strengthen one or more portions of the tabletop 12, such as the lip 30, which may help prevent damage to the tabletop 12.

The supports 100 may also help reduce or prevent damage during use. For example, the table 10 may be configurable in use and storage arrangements, and the table 10 may be stored between uses. The table 10 may be dropped, tipped on its side, stuffed into a storage closet, etc., which may result in contact between the tabletop 12 and various items (e.g., the floor, closet doors, other tables, etc.). The supports 100 may reduce or prevent damage to the tabletop 12.

In an exemplary embodiment, the supports 100 may be formed by the inner wall 54 of the lip 30. The supports 100 may protrude inwardly towards the center portion 34 of the tabletop 12. The supports 100 may include an upper or proximal portion 102, and the upper portion 102 may be connected to the lower portion 16 of the tabletop 12. The supports 100 may include a lower or distal portion 104, and the lower portion 104 may be disposed towards the distal portion 52 of the lip 30. The supports 100 may include a contact surface 106, and the contact surface 106 may be sized and configured to contact a portion of the frame 40, such as the first segment 72 of the siderail 42, 44. The lower portion 104 of the support 100 may be sized and configured to be disposed at least proximate the second segment 74 of the siderail 42, 44. The lower portion 104 and the contact surface 106 may be sized and configured to contact, support, and/or be disposed at least proximate the second side 70 of the side rail 42, 44.

The supports 100 may include one or more sides, such as a first side 108 and a second side 110. The support 100 may also include one or more rounded or curved portions, such as rounded corners. The support 100 may further include a volume or hollow interior portion 112, and the hollow interior portion 112 of the support 100 may be in fluid communication with the hollow interior portion 18 of the tabletop 12.

As shown in the accompanying figures, the tabletop 12 may include a plurality of supports 100, and the supports 100 may be generally aligned. For example, a plurality of supports 100 may be generally aligned in a straight line along the inner surface 54 of the lip 30. The supports 100 may extend along at least a majority of the inner surface 54 of the lip 30, and the supports 100 may be disposed at least proximate the siderail 42, 44 when the frame 40 is connected to the tabletop 12. The supports 100 may be enclosed or at least partially bounded by the lip 30 and the siderails 42, 44 when the frame 40 is attached to the tabletop 12.

One or more of the supports 100 may be disposed in a pattern, and the tabletop 12 may include one or more patterns. An exemplary pattern may include a plurality of the supports 100, and the supports 100 may be disposed in a generally consistent configuration and/or arrangement. In addition, one or more of the supports 100 in the pattern may have generally the same size, shape, configuration, and/or arrangement. The generally consistent configuration and/or arrangement of the supports 100 may support at least a portion of the lip 30 in a generally uniform manner. In an exemplary embodiment, the lip 30 may have generally consistent properties and/or characteristic, such as strength, structural integrity, rigidity, and the like, because, among other reasons, the lip 30 may be supported by a plurality of generally similar supports 100 that are disposed in a generally uniform pattern.

One or more of the supports 100 may be disposed in a regular, repeating pattern. For example, the supports 100 may be generally aligned in a parallel configuration along a length of the inner wall 54 of the lip 30. The supports 100 may also be disposed in a generally consistent matter along a length of the inner wall 54 of the lip 30. In an exemplary embodiment, the supports 100 may be disposed along more than about fifty percent (50%) of the inner wall 54 along the sides 20, 22 of the tabletop 12, more than about sixty percent (60%) of the inner wall 54 along the sides 20, 22 of the tabletop 12, more than about seventy percent (70%) of the inner wall 54 along the sides 20, 22 of the tabletop 12, more than about eighty percent (80%) of the inner wall 54 along the sides 20, 22 of the tabletop 12, more than about ninety percent (90%) of the inner wall 54 along the sides 20, 22 of the tabletop 12, or more.

An exemplary pattern of the supports 100 may be disposed in one or more sections where the frame 40 is connected to the tabletop 12. For example, the siderails 42, 44 of the frame 40 may be disposed at least proximate the sides 20, 22 of the tabletop 12, and the pattern may be disposed along one or more sections of the lip 12 where the siderails 42, 44 are attached. In an exemplary embodiment, a length of the section where the pattern is disposed may be about ninety percent (90%) or more of the length of the siderail 42, 44. In another exemplary embodiment, a length of the section where the pattern is disposed may be about ninety-five percent (95%) or more of the length of the siderail 42, 44. After reviewing this disclosure, one skill in the art will appreciate the size of the pattern may be larger or smaller, such as larger or smaller than the length of the siderails 42, 44.

The sides 108, 110 of the supports 100 may be at least partially bounded by a joint 114, and the joint 114 may be formed by at least a portion of the inner wall 54 and the outer wall 56 of the lip 30 in contact or close proximity. For example, a portion of the inner wall 54 and the outer wall 56 may contact or touch to form the joint 114.

As shown in the accompanying figures, a joint 114 may be disposed on each side of the support 100, such as the first side 108 and the second side 110. The joints 114 may at least partially separate adjacent supports 100. The joints 114 may also at least partially or entirely prevent direct fluid communication between adjacent supports 100 when the joint is disposed between adjacent supports 100.

The joints 114 may provide additional support for the lip 30. For example, if the joint 114 contacts or is disposed at least proximate the outer wall 56, the joint 114 may provide additional reinforcement and/or strengthening of the outer wall 56 of the lip 30. This additional reinforcement and/or strengthening may help prevent the lip 30 from inadvertently bending or deforming when a force is applied.

The joint 114 may have a height measured between a proximal end, which may be disposed at least proximate the lower portion 16 of the tabletop 12, and a distal end, which may be disposed towards the distal portion 52 of the lip 30. The joints 114 may be disposed in a pattern, and the pattern may include a plurality of joints. For example, the pattern may include one or more joints 114 and the joints 114 may be disposed in a generally consistent arraignment. In addition, the joints 114 in the pattern may have a generally constant height, and the joints 114 may be spaced apart by a generally constant distance. The joints 114 disposed in the pattern may have generally the same size, shape, configuration, and arrangement, and the joints 114 may be disposed in a generally uniform arrangement, which may help create a tabletop 12 with generally uniform properties and characteristics.

Figure 4C:
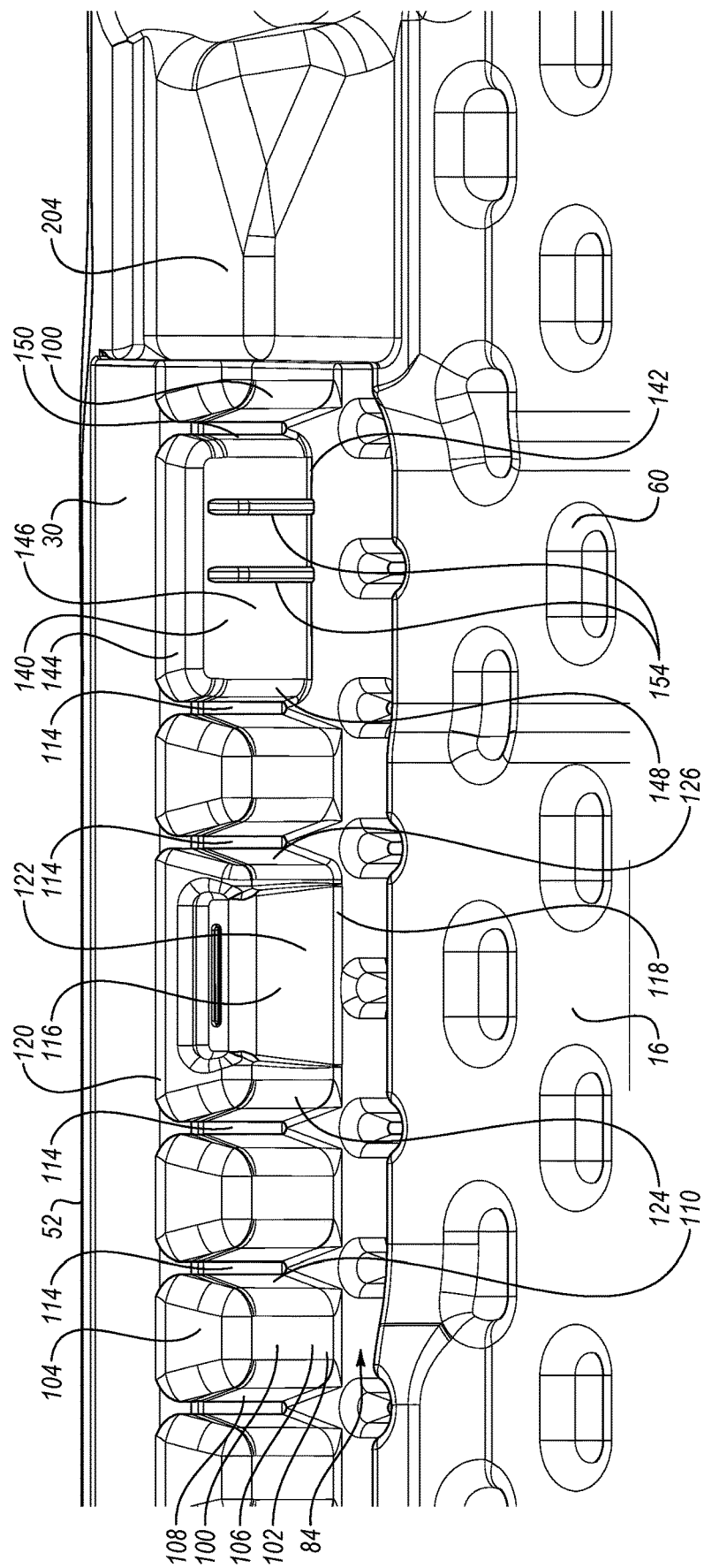
FIG. 4C is an enlarged view of a portion of the exemplary tabletop.
Figure 6:
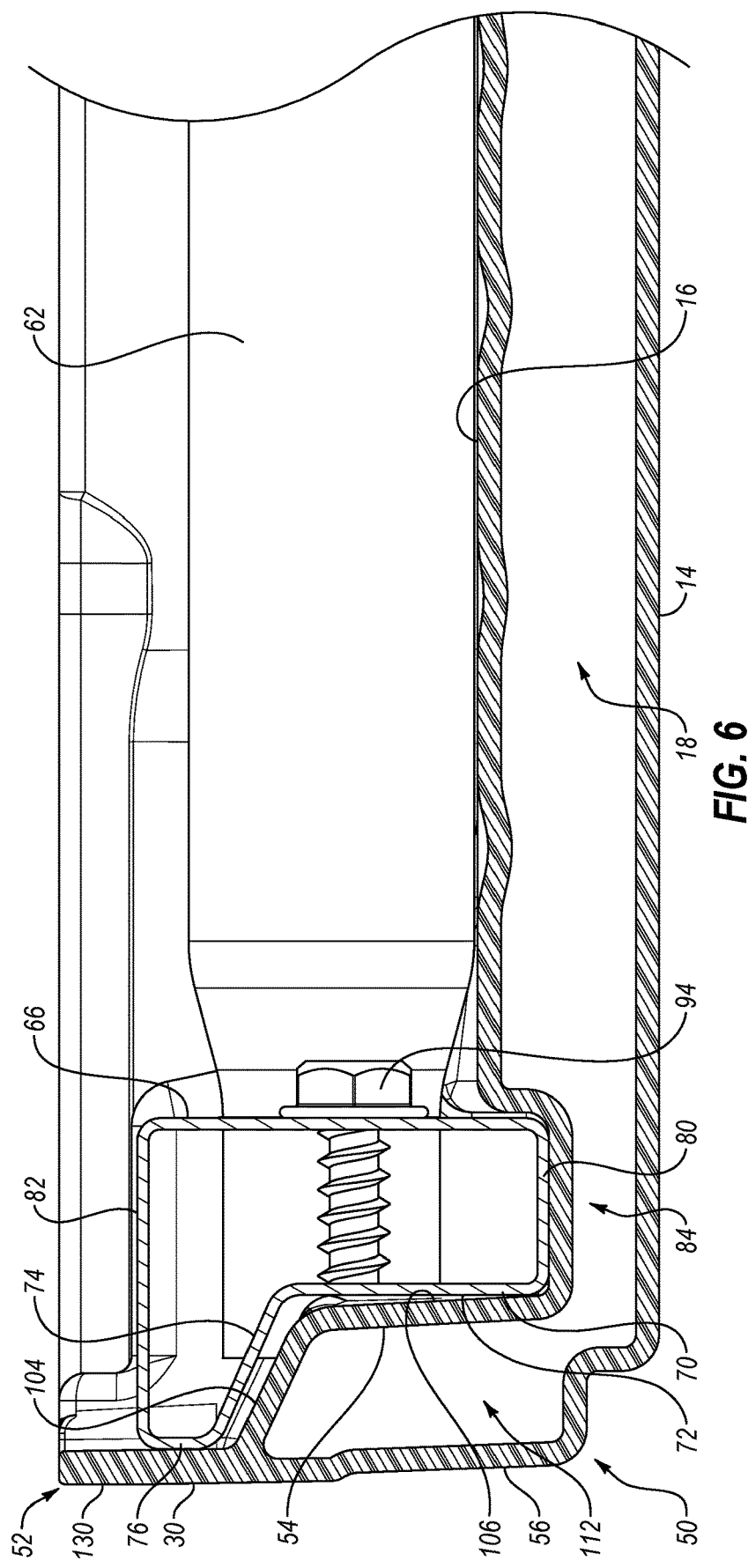
FIG. 6 is an enlarged cross-sectional side view of a portion of an exemplary tabletop, illustrating an exemplary support.
Figure 7:
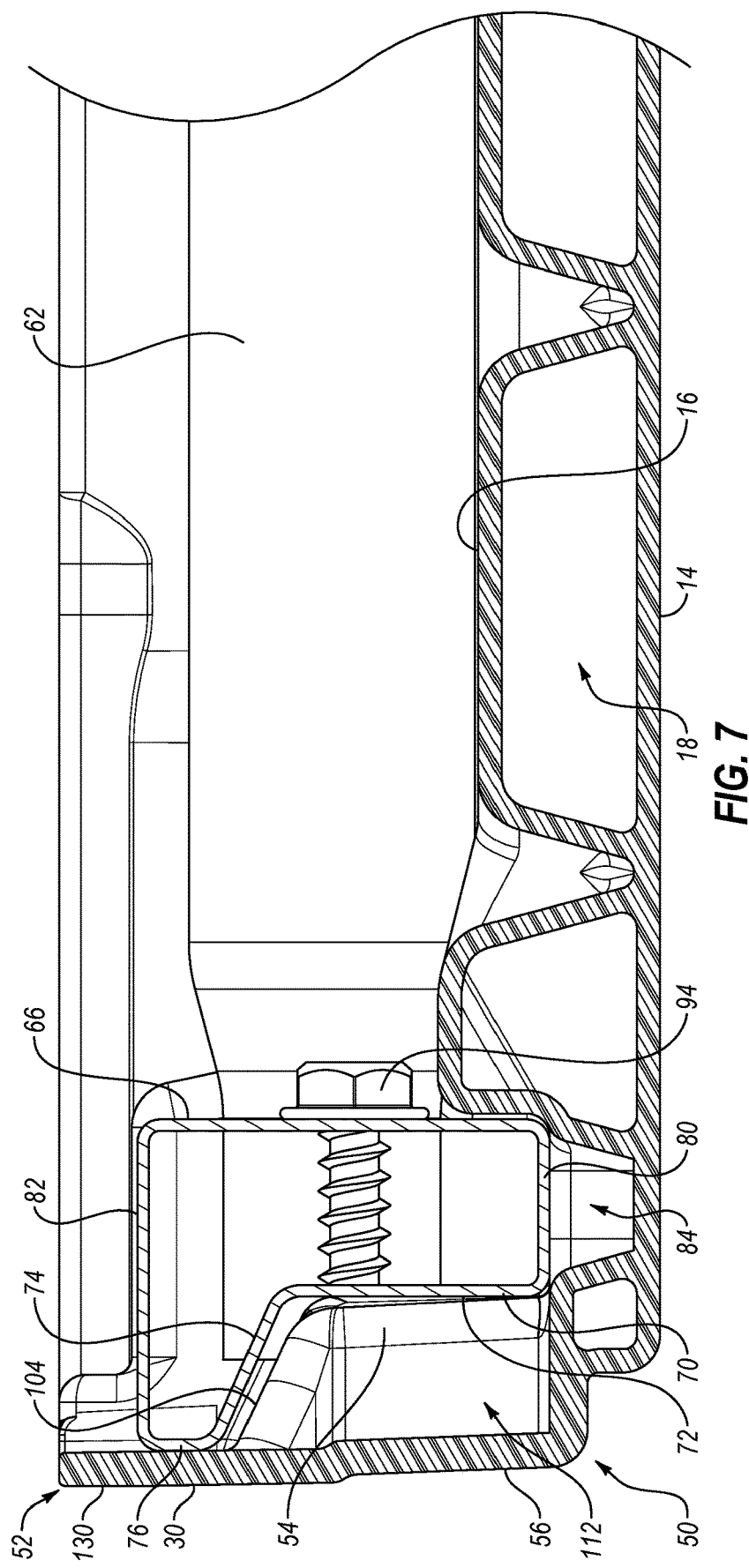
FIG. 7 is an enlarged cross-sectional side view of a portion of an exemplary tabletop, illustrating an exemplary joint.
Figure 8:
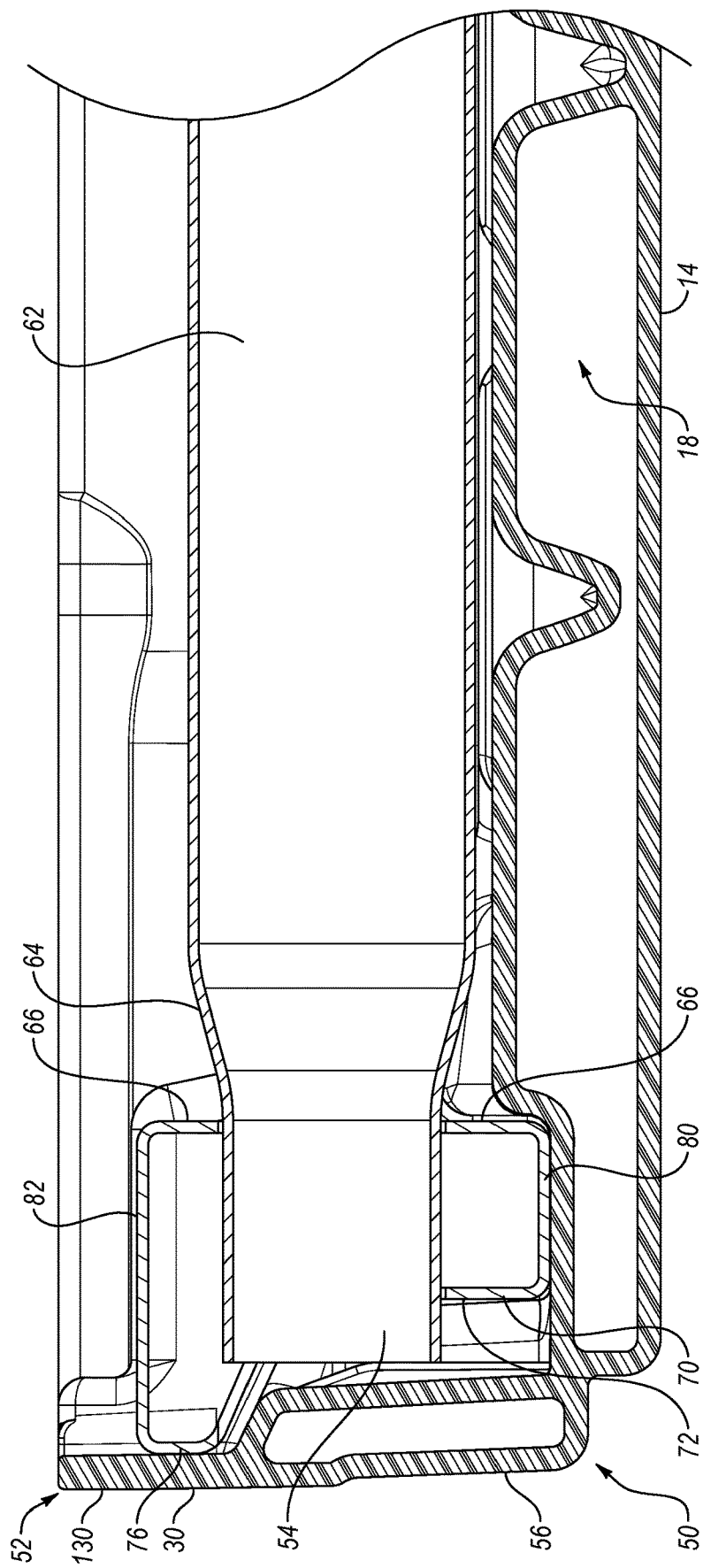
FIG. 8 is an enlarged cross-sectional side view of a portion of an exemplary tabletop, illustrating an exemplary alignment portion.

In an exemplary embodiment, the joints 114 and the supports 100 may be disposed in a generally consistent or regular pattern. For example, the average height of the supports 100 and the joints 114 may be generally the same. The pattern may also include the supports 100 and the joints 114 disposed in a generally consistent arrangement. For instance, the supports 100 and the joints 114 in the pattern may be spaced apart by a generally constant distance. In an exemplary embodiment shown in FIGS. 4A-4C, the supports 100 and the joints 114 may be disposed in a generally parallel configuration, and at least a portion of the pattern may include alternating supports 100 and joints 114. In addition, the proximal ends of the supports 100 and the joints 114 may be generally aligned along an axis or in a straight line, and the distal ends of the supports 100 and the joints 114 may be generally aligned along an axis or in a straight line. As shown in the accompanying figures, the proximal and distal ends of the supports 100 and the joints 114 may be disposed along generally parallel axes.

The joints 114 may have a double wall thickness that is generally equal to a thickness of the inner wall 54 and the outer wall 56 of the lip 30. The joint 114 may have generally the same thickness as the distal end 52 of the lip 30 because the distal end 52 of the lip 30 may include a compression edge. Thus, in an exemplary embodiment, the joint 114 and the distal end 52 of the lip 30 may have generally the same thickness.

In an exemplary embodiment, the supports 100 and the joints 114 may be disposed along one or more sides 20, 22 and/or ends 24, 26 of the tabletop 12. For example, the supports 100 and the joints 114 may be disposed along the portions of the tabletop 12 sized and configured to be connected to the frame 40. The supports 100 and the joints 114 may facilitate connection of the siderails 42, 44 to the tabletop 12, and a generally uniform pattern of the supports 100 and the joints 114 may create a tabletop 12 with generally uniform properties and characteristics.

The inner wall 54 of the lip 30 may also include other structures or features, such as one or more attachment portions 116. The attachment portions 116 may be sized and configured to facilitate attachment of the frame 40 to the tabletop 12. In particular, the attachment portions 116 may facilitate attachment of the siderails 42, 44 of the frame 40 to the tabletop 12. The attachment portions 116 may be disposed in the inner wall 54 of the lip 30, and the attachment portions 116 may protrude inwardly towards the center portion 34 of the tabletop 12. The attachment portions 116 may include an upper or proximal portion 118 that may be connected to the lower portion 16 of the tabletop 12. The attachment portions 116 may also include a lower or distal portion 120 that may be disposed towards the distal portion 52 of the lip 30. The attachment portions 116 may include a contact surface 122, and the contact surface 122 may be sized and configured to contact a portion of the frame 40, such as the first segment 72 of the siderail 42, 44. The lower portion 120 of the attachment portions 116 may be sized and configured to be disposed at least proximate the second segment 74 of the siderail 42, 44. The attachment portions 116 may include a first side 124 and a second side 126, and the attachment portions 116 may include one or more rounded surfaces or corners, such as rounded corners. The attachment portions 116 may include a volume or hollow interior portion 128, and the hollow interior portion 128 of the attachment portions 116 may be in fluid communication with the hollow interior portion 18 of the tabletop 12.

The attachment portions 116 may facilitate attachment of the frame 40 to the tabletop 12. For example, the attachment portions 116 may be generally aligned with the openings 92 in the siderails 42, 44 to facilitate connection of the siderails 42, 44 to the tabletop 12. For example, the connector 94 may extend through the openings 92 in the siderail 42, 44 and into the attachment portion 116, The connector 94 may engage one or more portions of the attachment portion 116, which may facilitate secure attachment of the siderail 42, 44 to the tabletop 12.

One or more of the attachment portions 116 may be generally aligned, such as along the inner surface 54 of the lip 30, and the attachment portions 116 may have generally the same size, shape, configuration, and/or arrangement. The attachment portions 116 may be disposed in the proximal portion 50 of the lip 30, and the attachment portions 116 may be disposed at least proximate the intersection of the lip 30 and the tabletop 12. The attachment portions 116 may be sized and configured to be enclosed or at least partially bounded by the lip 30 and the siderails 42, 44.

One or more of the attachment portions 116 may be disposed in a pattern, and the attachment portions 116 disposed in the pattern may have a generally consistent size, shape, configuration, and/or arrangement. The pattern may include other structures such as one or more of the supports 100 and/or the joints 114. For example, the attachment portions 116 may be generally aligned with the supports 100 and/or the joints 114 along the inner wall 54 of the lip 30. In addition, the lower portion 120 of the attachment portions 116 may be generally aligned with and/or disposed in a generally parallel configuration with the lower portion 104 of the supports 100. The contact surface 122 of the attachment portion 116 may also be generally aligned with and/or disposed in a generally parallel configuration with the contact surface 106 of the support 100. Thus, the pattern may include one or more of the supports 100, the joints 114, and the attachment portions 116, and these structures may be generally aligned.

The sides 124, 126 of the attachment portions 116 may be at least partially bounded by one or more joints 114. For example, a first joint 114 may be disposed on the first side 124 of the attachment portions 116 and a second joint 114 may be disposed on the second side 126 of the attachment portions 116. The joints 114 may at least partially separate the attachment portions 116 from other structures, such as adjacent supports 100. The joints 114 may also at least partially or entirely prevent direct fluid communication between the attachment portion 116 and adjacent structures, such as adjacent supports 100.

The attachment portions 116 may have a generally constant height. The height of the attachment portions 116 may be generally equal to the height of the supports 100 and/or the joints 114. If the supports 100, the joints 114, and/or the attachment portions 116 have generally the same height, the supports 100, the joints 114, and the attachment portions 116 may be generally in a row and/or a straight line.

The attachment portions 116 may be disposed in a pattern, and the pattern may include one or more of the supports 100 and/or the joints 114. For example, the pattern may include the supports 100, the joints 114, and/or the attachment portions 116 disposed in a generally consistent arraignment. In an exemplary embodiment, the supports 100, the joints 114, and/or the attachment portions 116 disposed in the pattern may have a generally constant height, may be spaced apart by generally constant distance, may be generally aligned, may be disposed in generally parallel configuration, may be disposed in a generally consistent or regular pattern, and/or may be disposed in a generally straight line in the inner wall 54 of the lip 30. In addition, the supports 100, the joints 114, and/or the attachment portions 116 in the pattern may have generally consistent sizes, shapes, configurations, and arrangements. The proximal ends of the supports 100, the joints 110, and/or the attachment portions 116 may be generally aligned along an axis or in a straight line, and the distal ends of the supports 100, the joints 110, and the attachment portions 116 may be generally aligned along an axis or in a straight line. As shown in the accompanying figures, the proximal and distal ends of the supports 100, the joints 110, and the attachment portions 116 may be disposed along generally parallel axes.

The proximal portion 50 of the lip 30 may include the supports 100, the joints 114, and the attachment portions 116. The distal portion 52 of the lip 30 may include the inner wall 54 and the outer wall 56 in close proximity. When the inner and outer walls 54 and 56 of the lip 30 are be disposed in close proximity, the walls 54, 56 may be spaced apart by about 5 mm (0.2 in.) or less, such as about 4 mm (0.16 in.), about 3 mm (0.12 in.), about 2 mm (0.08 in.); about 1 mm (0.04 in.), about 0.5 mm (0.02 in.), or less. At least a portion of the inner and outer walls 54, 56 may touch or contact, which may form a compression edge 130. For example, the inner wall 54 and the outer wall 56 may be disposed in a generally parallel configuration, and at least a portion of an inner surface of the inner wall 54 and at least a portion of an inner surface of the outer wall 56 may contact or touch to form the compression edge 130.

The compression edge 130 may have a generally consistent size, such as a height. For example, the compression edge 130 may have an average height generally equal to about fifty percent (50%) of a height of the lip 30. The compression edge 130, however, may be larger or smaller. For example, the compression edge 130 may be greater than about fifty percent (50%) of the height of the lip 30, such as about sixty percent (60%), about seventy percent (70%), about eighty percent (80%), about ninety percent (90%), or more. The compression edge 130 may also have a height less than about fifty (50%) of the height of the lip 30, such as about forty percent (40%), about thirty percent (30%), about twenty percent (20%), about ten percent (10%), or less.

In an exemplary embodiment, the compression edge 130 may have an average height that is equal to about twenty-five percent (25%) of the height of the inner wall 54 of the lip 30. The supports 100, the joints 114, and/or the attachment portions 116 may have an average height this is equal to about seventy-five percent (75%) of the height of the inner wall 54 of the lip 30. Thus, the ends of the supports 100, the joints 114, and/or the attachment portions 116 may meet and/or may be connected to the compression edge 130. After reviewing this disclosure, one skill in the art will appreciate that the supports 100, the joints 114, the attachment portions 116, and the compression edge 130 may be larger or smaller. For example, the compression edge 130 could be greater than about twenty-five percent (25%) of the height of the inner wall 54 of the lip 30, such as about thirty present (30%), about thirty-five percent (35%), about forty percent (40%), about forty-five percent (45%), about fifty percent (50%), about fifty-five percent (55%), about sixty percent (60%), about sixty-five percent (65%), about seventy percent (70%), or more. The compression edge 130 could also be smaller, such as an average height that is less about twenty-five percent (25%) of the height of the inner wall 54 of the lip 30, such as about twenty present (20%), about fifteen percent (15%), about ten percent (10%), about five percent (5%), or less. The corresponding height of the supports 100, the joints 114, the attachment portions 116 may be larger or smaller.

The compression edge 130 may have a generally uniform size, and the compression edge 130 may extend about all or at least a portion of the perimeter 32 of the tabletop 12. For example, the compression edge 130 may extend about at least a portion of the sides 20, 22, the ends 24, 26, the corners 28, and/or the perimeter 32 of the tabletop 12. The compression edge 130 may have a generally uniform area of contact between the inner wall 54 and the outer wall 56 of the lip 30. The compression edge 130 may form at least a portion, substantially all, or the entire distal portion 52 of the lip 30. The compression edge 130 may provide additional rigidity and/or strength to the distal portion 52 of the lip 30. The compression edge 130 may have generally the same height, and the compression edge 130 may form the distal portion 52 of the lip 30. Advantageously, if the compression edge 130 has a generally uniform size, shape, configuration, and/or arrangement, the distal portion 52 of the lip 30 may have generally uniform properties and characteristics.

In an exemplary embodiment, the distal portion 52 of the lip 30 may include the compression edge 130 and the proximal portion 50 of the lip 30 may include the supports 100, the joints 114, and/or the attachment portions 116. The lower portion of the supports 100, the joints 114, and/or the attachment portions 116 may be disposed at least proximate an upper portion of the compression edge 130. If desired, the lower portion of the supports 100, the joints 114, and/or the attachment portions 116 may contact or touch the compression edge 130. If each of the supports 100, the joints 114, the attachment portions 116, and the compression edge 130 have generally the same size, shape, configuration, and/or arrangement, the lip 30 may have generally uniform properties and characteristics.

The table 10 may include other features, components, and structures, such a receiving portion 132. The receiving portion 132 may be sized and configured to receive a portion of an adjacent table when the tables are disposed in a nested configuration. For example, the receiving portion 132 may be at least partially formed in the upper portion 14 and the outer wall 56 of the lip 30, and the receiving portion 132 may include an inner surface 134. The inner surface 134 of the receiving portion 132 may be disposed at least proximate an upper portion of the supports 100, the joints 114, and/or the attachment portions 116. If desired, a portion of one or more of the supports 100, a portion of one or more of the joints, and/or a portion of one or more of the attachment portions 116 may contact or support the receiving portion 132. The receiving portion 132 may be similar to one or more of the receiving portions described in U.S. Pat. Nos. 8,347,795; 8,397,652; 8,408,146; 8,578,863; 8,622,007; and 9,138,050; each of which incorporated by reference in its entirety. In addition, the table 10 and tabletop 12 may include one or more features, aspects, or components, such as shown in U.S. Pat. Nos. 8,347,795; 8,397,652; 8,408,146; 8,578,863; 8,622,007; and 9,138,050; each of which incorporated by reference in its entirety.

The supports 100, the joints 114, the attachment portions 116, and/or the compression edge 130 may provide increased structural integrity and/or rigidity. For example, the supports 100, the joints 114, the attachment portions 116, and/or the compression edge 130 may provide increased structural integrity and/or rigidity to the lip 30, which may help prevent unintentional bending, bowing, or flexing of the lip 30. The supports 100, the joints 114, the attachment portions 116, and/or the compression edge 130 may also provide increased structural integrity and/or rigidity to the receiving portion 132. The increased structural integrity and/or rigidity of the receiving portion 132 may facilitate nesting of the tables because the receiving portion 132 may be able to support a larger amount of force or weight For instance, in the stacked configuration, the distal end 52 of the lip 30 of an upper table may be disposed in the receiving portion 132 of a lower table Accordingly, a stress associated with the stacked tables may be applied to the receiving portion 132, and a table at or near the bottom of a plurality of stacked tables may be under significant force from the weight of the stacked tables. Because the receiving portion 132 may be supported by one or more of the supports 100, one or more of the joints 114, and/or one or more of the attachment portions 116, the reinforced receiving portion 132 may enable additional tables to be disposed in the stacked configuration and/or reduce the likelihood that the tables are damaged in the stacked configuration.

The table 10 may include other features, components, and structures, such an alignment portion 140. The alignment portion 140 may be sized and configured to facilitate attachment, alignment, and/or positioning of a cross member, crossbar, or the like. For example, the alignment portion 140 may be used in connection with the cross member 62. The alignment portion 140 may also be used in connection with other suitable structures and components.

The alignment portion 140 may be disposed in the inner wall 54 of the lip 30, and the alignment portion 140 may protrude inwardly towards the center portion 34 of the tabletop 12. The alignment portion 140 may include an upper portion 142 connected to the lower portion 16 of the tabletop 12. The alignment portion 140 may include a lower portion 144 which may be disposed towards the distal portion 52 of the lip 30. The alignment portion 140 may include a contact surface 146, and the contact surface 146 may be sized and configured to contact a portion of the frame 40, such as the first segment 72 of the siderail 42, 44. The lower portion 144 of the alignment portion 140 may be sized and configured to be disposed at least proximate the second segment 74 of the siderail 42, 44. The alignment portion 140 may include a first side 148 and a second side 1150, and the alignment portion 140 may include one or more rounded surfaces or corners, such as rounded corners. The alignment portion 140 may include a volume or hollow interior portion 152, and the hollow interior portion 152 may be in fluid communication with the hollow interior portion 18 of the tabletop 12.

The alignment portions 140 may be disposed in pairs and may be generally aligned with the cross member 62. For example, the cross member 62 may extend through the openings 68, 78 in the siderail 42, 44 and the ends of the cross member 62 may be disposed at least proximate the contact surface 146 of the alignment portions 140. The alignment portion 140 may include one or more guides 154, and the guides 154 may facilitate positioning of the cross member 62. For example, the guides 154 may extend inwardly towards the center portion 34 of the tabletop 12 and the guides 154 may facilitate positioning of the cross member 62. The guides 154 may be sized and configured to help prevent unintended movement of the cross member 62, and the guides 154 may help maintain the cross member 62 in the desired position.

The alignment portions 140 may be disposed along the inner surface 54 of the lip 30, and each of the alignment portions 140 may have generally the same size, shape, configuration, and/or arrangement. The alignment portions 140 may be disposed in the proximal portion 50 of the lip 30, and the alignment portions 140 may be disposed at least proximate the intersection of the lip 30 and the tabletop 12. The alignment portions 140 may be sized and configured to be enclosed or at least partially bounded by the lip 30 and the siderails 42, 44.

The alignment portions 140 may be part of a pattern, such as one or more of the exemplary patterns disclosed herein. The pattern may include one or more of the supports 100, the joints 114, the attachment portions 116, and/or the alignment portions 140. The alignment portions 140 may be generally aligned with the supports 100, the joints 114, and/or the attachment portion 116 as part of the pattern. In an exemplary embodiment of the pattern, the supports 100, the joints 114, the attachment portions 116, and/or the alignment portions 140 may have generally the same height, spaced apart by generally constant distances, generally aligned along an axes, disposed in generally parallel configuration, disposed in a generally consistent or regular pattern, and/or disposed in a generally straight line in the inner wall 54 of the lip 30. One or more of the supports 100, the joints 114, the attachment portions 116, and/or the alignment portions 140 may have generally consistent sizes, shapes, configurations, and arrangements. This may allow the proximal ends of the supports 100, the joints 110, the attachment portions 116, and/or the alignment portions 140 to be aligned along an axis or in a straight line, and the distal ends of the supports 100, the joints 110, the attachment portions 116, and the alignment portions 140 to be generally aligned along an axis or in a straight line. Additionally, the proximal and distal ends of the supports 100, the joints 110, the attachment portions 116, and/or the alignment portions 140 may be disposed along generally parallel axes.

The height of the alignment portion 140 may be generally equal to the height of the supports 100, the joints 114, and/or the attachment portions 116. The generally equal height may allow one or more of the supports 100, the joints 114, the attachment portions 116, and/or the alignment portions 140 to be disposed in a row or generally straight line.

The sides 148, 150 of the alignment portion 140 may be at least partially bounded by one or more joints 114. For example, a first joint 114 may be disposed on the first side 148 of the alignment portion 140 and a second joint 114 may be disposed on the second side 150 of the alignment portion 140. The joints 114 may at least partially separate the alignment portion 140 from other structures, such as adjacent supports 100. The joints 114 may also at least partially or entirely prevent direct fluid communication between the alignment portion 140 and adjacent structures, such as adjacent supports 100.

As discussed above, the lip 30 may form an outer boundary or be disposed about at least a portion of the perimeter 32 of the tabletop 12. If the tabletop 12 is constructed from blow-molded plastic, the lip 30 may be difficult to form during the blow-molding process because the gas may have to flow to the outermost portions of the structure. In addition, the gas must have sufficient pressure to form the lip 30. Thus, the lip 30 may be difficult to form during the blow-molding process because the gas may have to travel significant distances and/or reach remote portions of the structure, and the gas has to be at the correct pressure to properly form the lip 30. If the gas flow and/or pressure are incorrect, then the lip 30 may not be properly formed during the blow-molding process and that may result in failure. It was previously known in the art to have gas flow passages that extend to the lower end of the lip to allow sufficient gas flow at the desired pressure to form the lip. It was previously thought that gas flow passages needed to extend to the lower end of the lip to allow the lip to be fully and completely formed during the blow-molding process. A surprising and unexpected result is the supports 100, the joints 114, the attachment portions 116, and/or the alignment portions 140 may not extend to the lower end of the lip 30, and the compression edge 130 may form the distal portion 52 of the lip 30 without any gas flow passages that extend to the lower end of the lip. Thus, the lip 30 of the tabletop 12 may be fully and completely formed during the blow-molding process without the gas flow passages that were previously required. One skilled in the art at the time of the invention did not expect or anticipate that a tabletop could be formed from blow-molded plastic in which the distal portion of the lip is a compression edge without any gas passages extending into the lower end of the lip, and the proximal portion of the lip may include a plurality of the supports, the joints, the attachment portions, and/or the alignment portions. In contrast, one skilled in the art at the time of the invention would have expected the lip to not be property formed during the blow-molding process. One skilled in the art at the time of the invention would have expected the lip to not properly form and the tabletop to be a failure because, among other reasons, there would not be sufficient gas flow and pressure to allow the lip to be formed during the blow-molding process. The supports 100, the joints 114, the attachment portions 116, and/or the alignment portions 140 disposed in the proximal portion 50 of the lip 30, however, allow the compression edge 130 to form the distal portion 52 of the lip 30.

After reviewing this disclosure, one skilled in the art will appreciate that the table 10, the tabletop 12, and accompanying features, aspects, and components, may have different shapes, sizes, configurations and/or arrangements depending, for example, upon the intended use of the table 10. It will also be understood that the table 10 and tabletop 12 and may include any suitable number and combination of features, aspects, and components; but none of the features, aspects, or components may be required. In addition, one skilled in the art, after reviewing this disclosure, will be understood that table 10 and the tabletop 12 may have other features, aspects, and components.

In another exemplary embodiment, such as shown in FIGS. 9-15, the tabletop 12 may not include one or more of the features, aspects, or components described above and/or the tabletop 12 may include one or more additional features, aspects, and/or components. For example, the tabletop 12 may have generally the same size, shape, configuration, and arrangement as the exemplary tabletop 12 described above (for convenience and readability, the same reference numbers may be used for similar or related features and components), but the tabletop 12 may not include the supports 100 and/or the joints 114. The tabletop 12 may include the attachment portions 116 sized and configured to attach the frame 40 to the tabletop 12. As shown in the accompanying figures the inner wall 54 of the lip 30 may be a generally planar structure other than the periodic spacing of the attachment portions 116.

Figure 9:
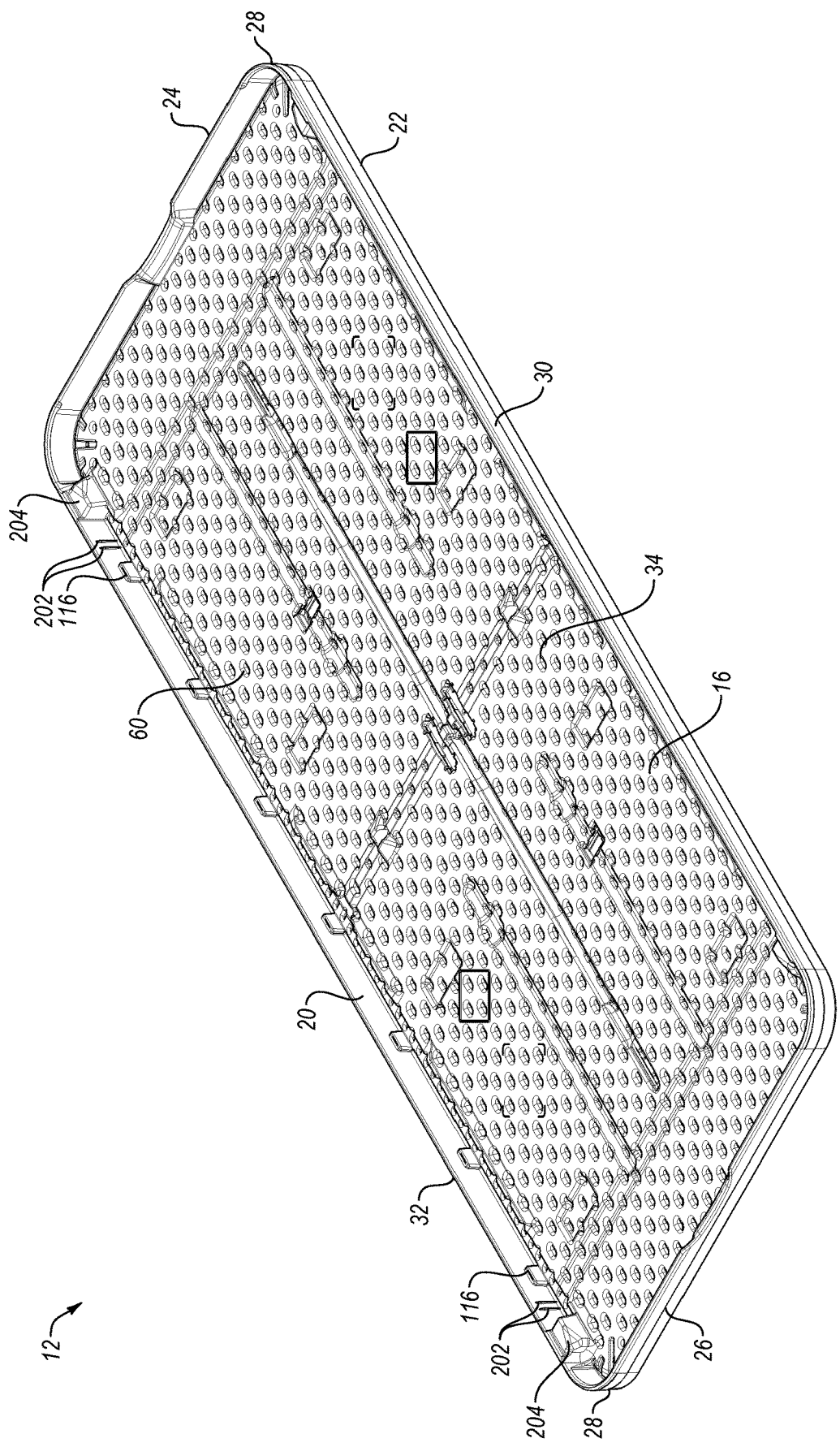
FIG. 9 is a lower perspective view of another exemplary tabletop.

As shown in FIG. 9, the inner surface 54 of the lip 30 may include one or more guides 202. The guides 202 may be disposed in the inner surface 54 of the lip 30, and a pair of guides 202 may disposed proximate where the cross member 62 is connected to the frame 40. In an exemplary embodiment, a pair of guides 202 may be disposed proximate each end of the siderails 42, 44, and the guides 202 may be generally aligned with the cross member 62. For example, the cross member 62 may extend through the openings 68, 78 in the siderails 42, 44 and the ends of the cross member 62 may be disposed at least proximate the guides 202. The guides 202 may facilitate positioning of the cross member 62. For example, the guides 202 may extend inwardly towards the center portion 34 of the tabletop 12, and the guides 202 may be aligned with one or more portions of the cross member 62. The guides 202 may be sized and configured to help prevent unintended movement of the cross member 62, and the guides 202 may help maintain the cross member 62 in the desired position.

The tabletop 12 may include one or more stops 204 and the stops 204 may be sized and configured to facilitate positioning of the siderails 42, 44 of the frame 40. For example, the stops 204 may be disposed towards the ends 24, 26 and/or corners 28 of the tabletop 12, and the siderails 42, 44 may be disposed between the stops 24. The ends of the siderails 42, 44 may contact the stops 204 and the stops may guide placement of the siderails 42, 44 during the manufacturing and/or assembly process. The stops 204 may also help prevent undesired twisting or bending of the tabletop 12. For instance, the stops 204 may help prevent the siderails 42, 44 from undesirably moving during use of the table 10. Further, the engagement of the siderails 42, 44 with the stop 204 may help maintain the siderails 42, 44 in a desired position, and the stops 204 may help absorb forces or impacts applied to the table top 200.

The tabletop 12 may include an elongated tack-off 206, and the elongated tack-off may be disposed between the attachment portions 116, between the attachment portions 116 and the stops 204, and the like. The elongated tack-off 206 may be formed by an outer wall 56 and an inner wall 54 of the lip 30 being in close proximity or contact. For example, the outer wall 56 and the inner wall 54 may at least partially touch or be in substantial proximity. A portion of the outer wall 56 and the inner wall 54 may also touch, connect, interlock, mesh, join, or otherwise be in contact.

The elongated tack-off 206 may be disposed at least proximate the intersection of the lip 30 and the tabletop 12. The elongated tack-off 206 may form a joint or coupling between the lip 30 and the center portion 34 of the tabletop 12. The elongated tack-off 206 may also form a solid structure between the lip 30 and the center portion 34 of the tabletop 12, and the solid structure may help securely connect the lip 30 and the tabletop 12. The solid structure may have increased strength, structural integrity, and/or rigidity because it may have a double wall thickness. The solid structure may also prevent fluid communication between the lip 30 and the center portion 34 of the tabletop 12.

As shown in FIGS. 9-15, the exemplary frame 40 may have a different size, shape, configuration, and/or arrangement than the frame described in connection with FIGS. 1-8. For example, the second segment 74 of the siderail 42, 44 may be disposed generally perpendicular to the first segment 72 and/or the third segment 76 of the siderail 42, 44. The second segment 74 may be disposed generally parallel to the upper surface 80 and/or the lower surface 82 of the siderail 42, 44. The second segment 74 may also be disposed generally perpendicular to the inner surface 66 and/or the outer surface 70 of the siderail 42, 44. After reviewing this disclosure, one skilled in the art will appreciate that the frame may have other suitable shapes, sizes, configurations, and/or arrangements.

The lip 30 may also have other suitable shapes, sizes, configurations, and/or arrangements, such as shown in the exemplary embodiments shown in FIG. 9-15. For example, the proximal portion 50 of the lip 30 may include the attachment portions 116, and the attachment portions 116 may be formed in the inner wall 54 of the lip 30. The attachment portions 116, however, may not be disposed proximate or adjacent to one or more of the joints 114. In an exemplary embodiment shown in FIGS. 9-15, the lip 30 may not include the joints 114.

Figure 10:
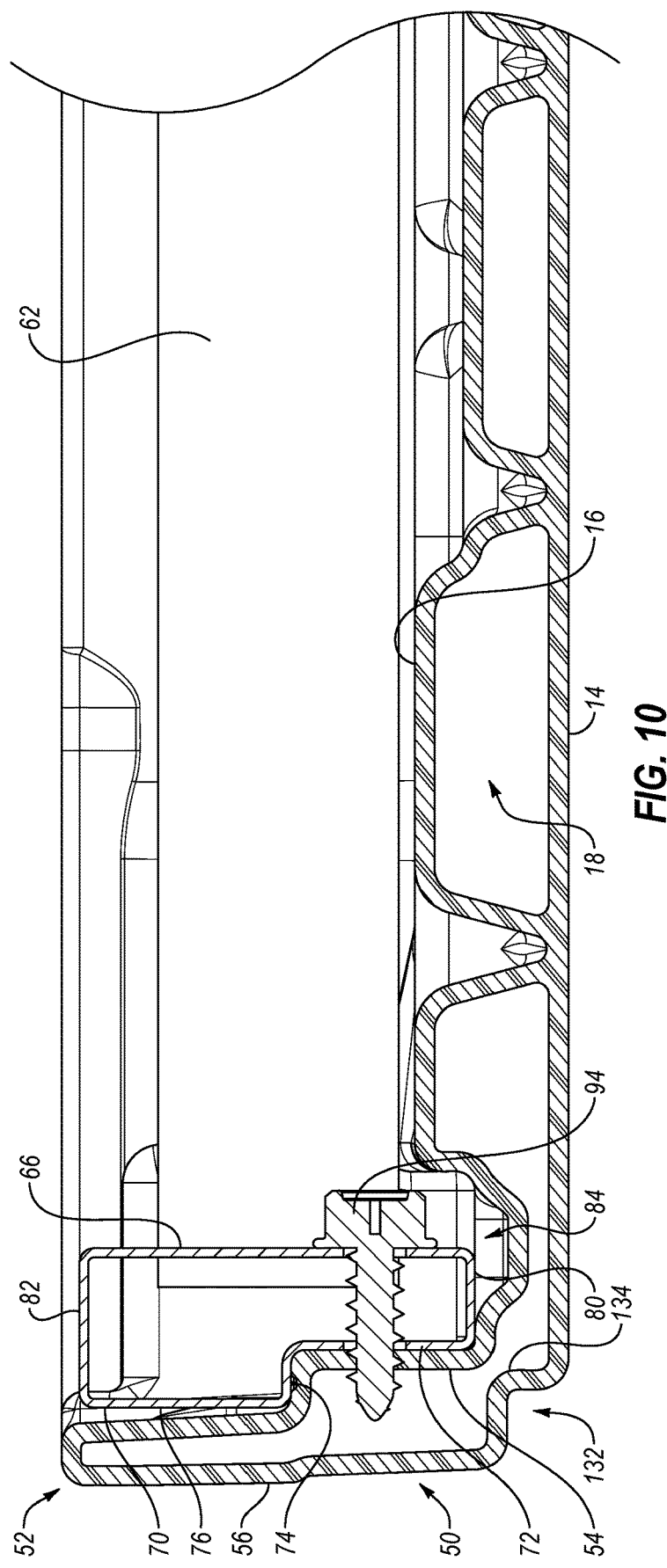
FIG. 10 is an enlarged cross-sectional side view of a portion of an exemplary tabletop, illustrating an exemplary frame connected to an exemplary attachment portion.
Figure 11:
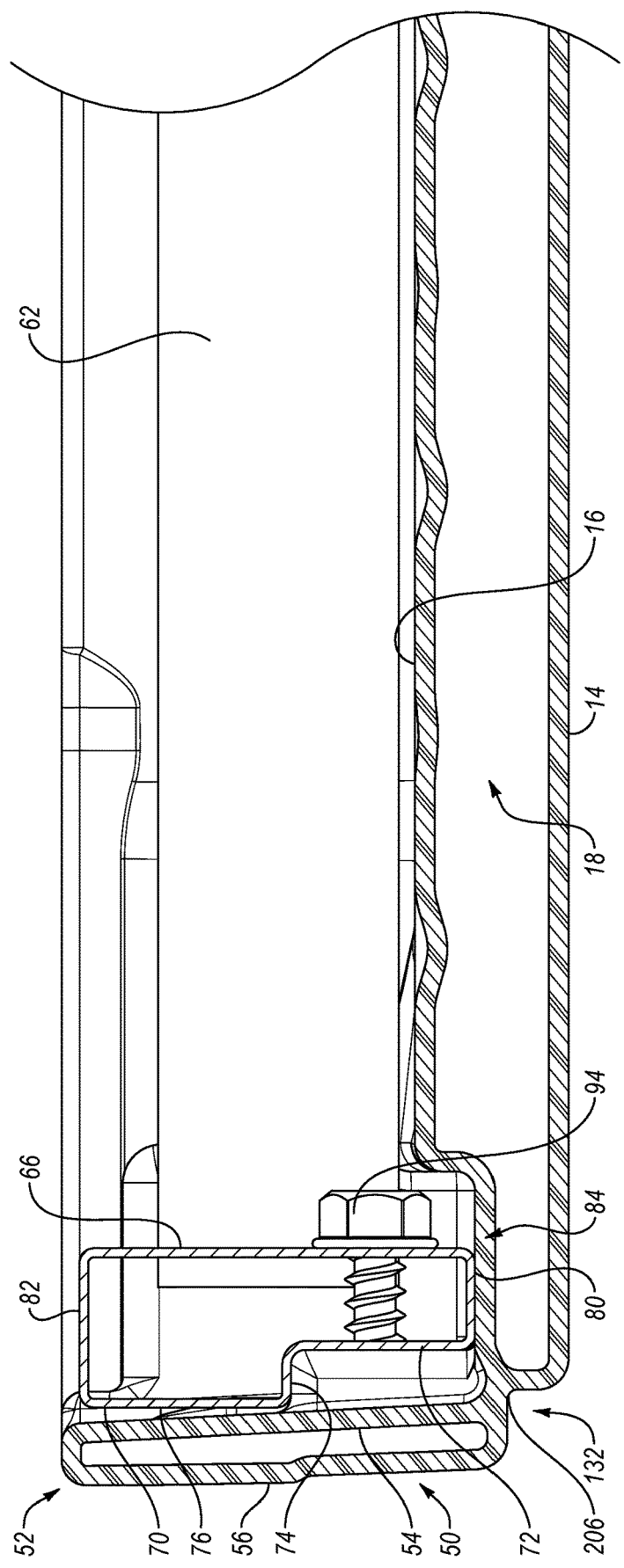
FIG. 11 is an enlarged cross-sectional side view of a portion of an exemplary tabletop, illustrating an exemplary elongated tack-off.
Figure 12:
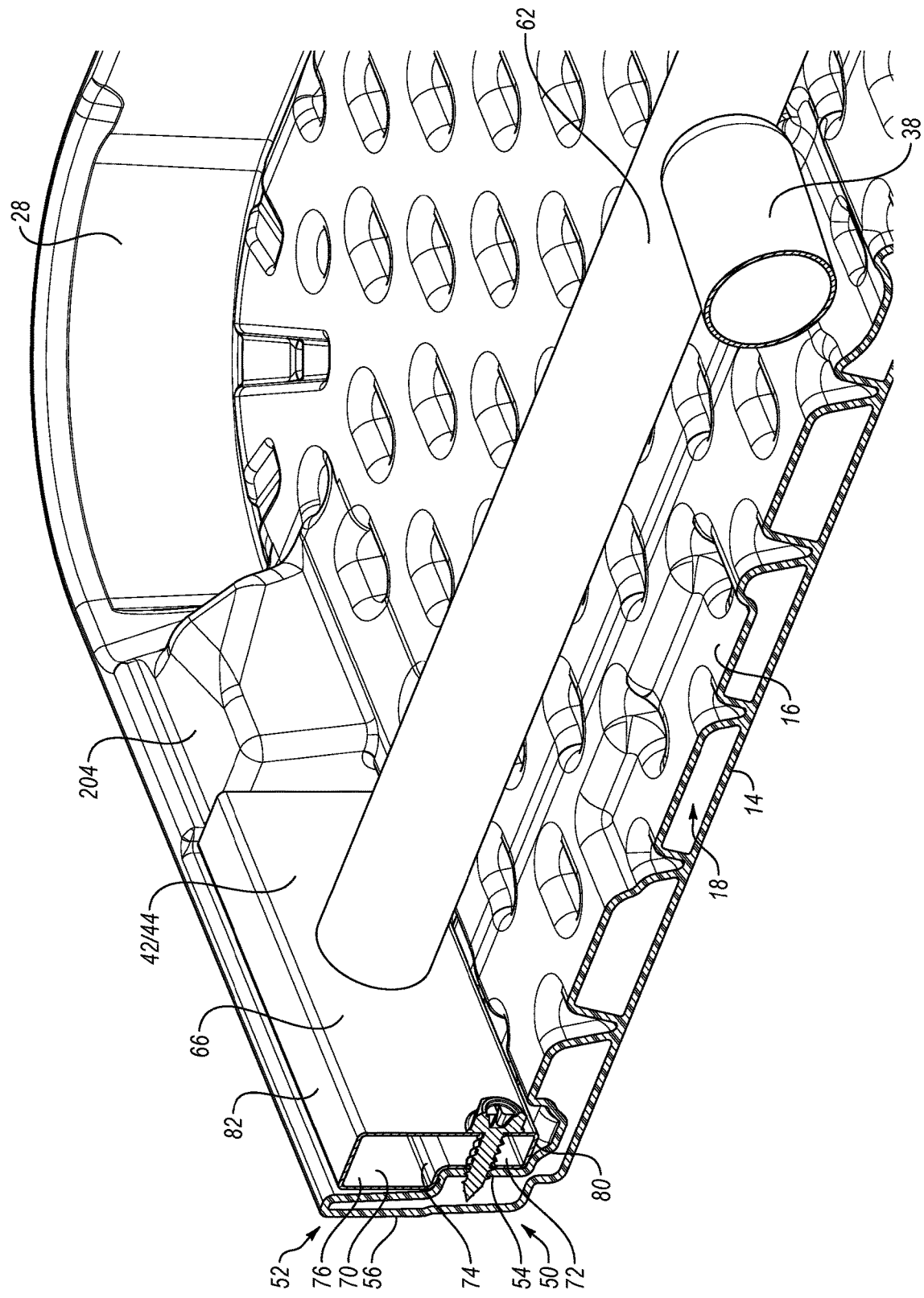
FIG. 12 is an enlarged cross-sectional side view of a portion of an exemplary tabletop, illustrating an exemplary support structure connected to an exemplary frame.
Figure 13:
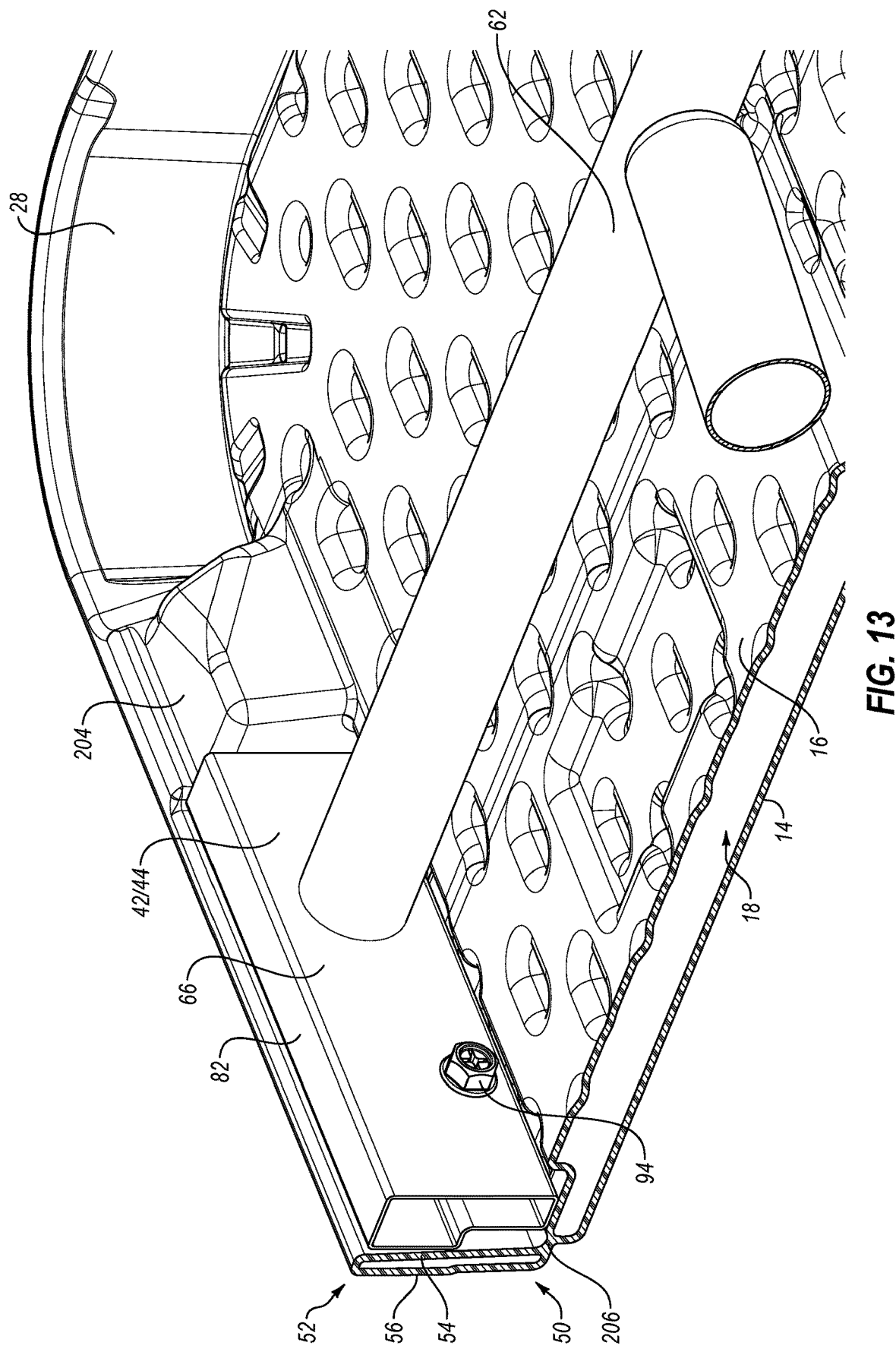
FIG. 13 is enlarged cross-sectional side view of a portion of an exemplary tabletop, illustrating an exemplary support structure connected to an exemplary frame.
Figure 14:
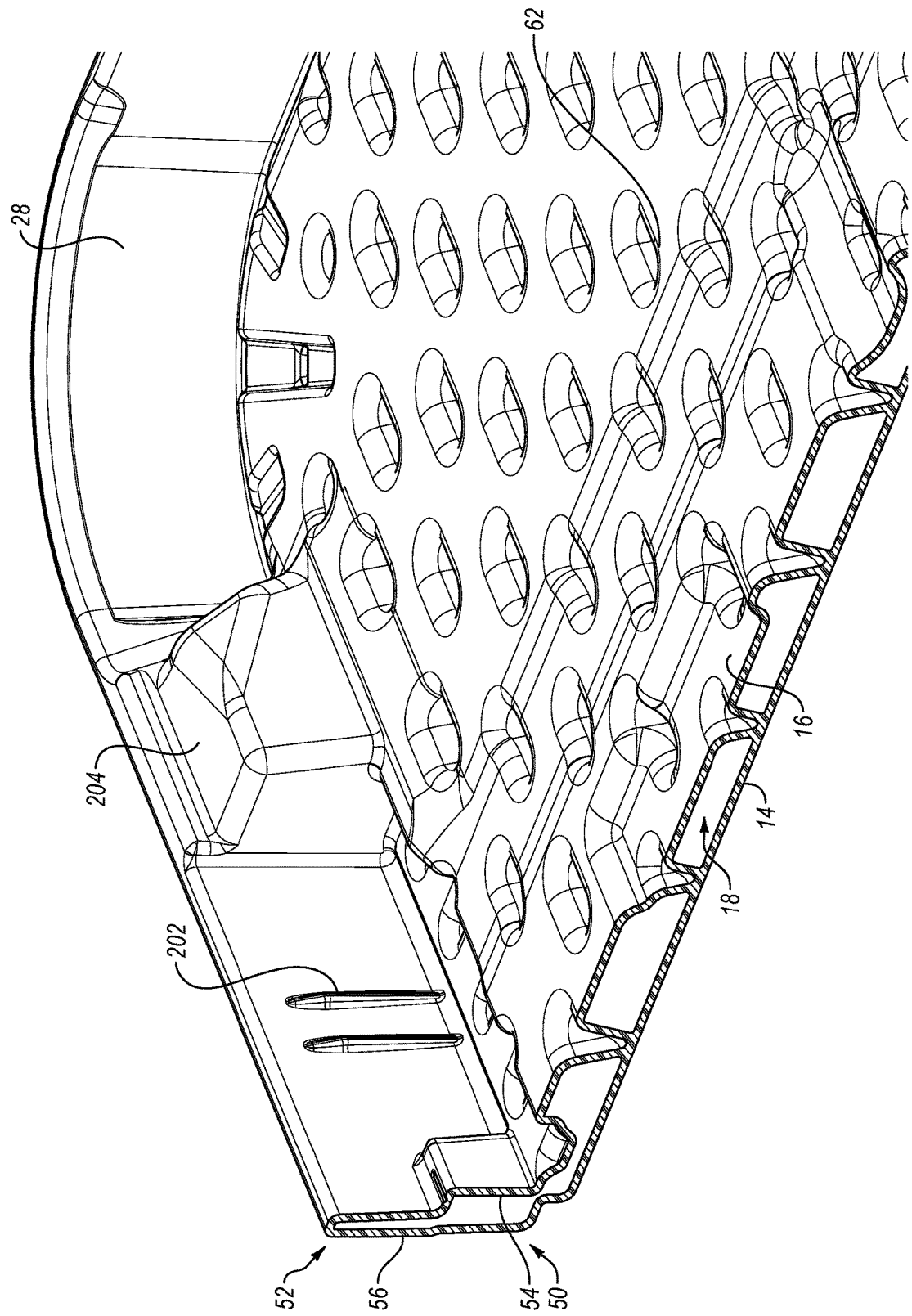
FIG. 14 is enlarged cross-sectional side view of a portion of an exemplary tabletop, illustrating an exemplary attachment portion.
Figure 15:
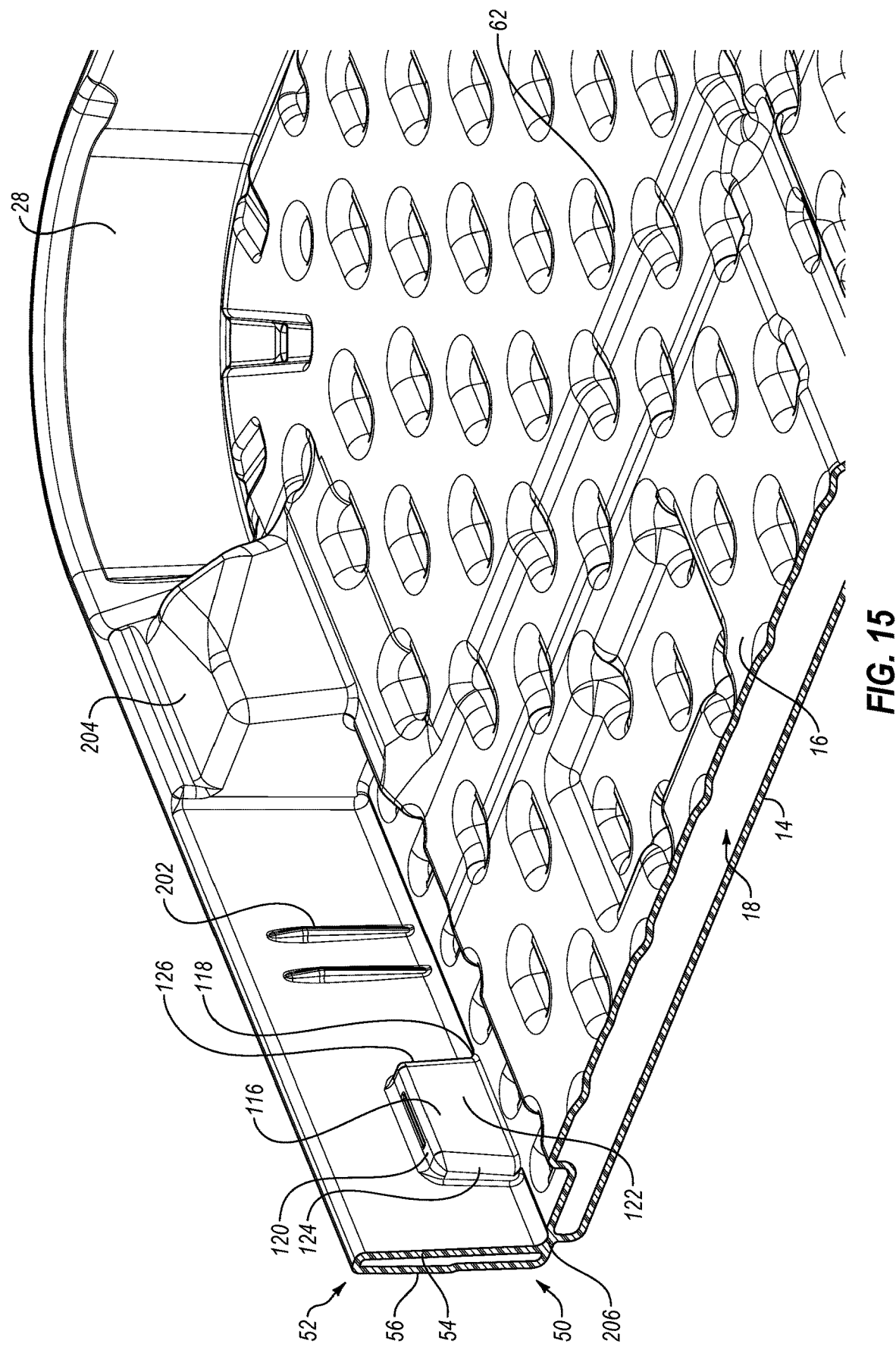
FIG. 15 is enlarged cross-sectional side view of a portion of an exemplary tabletop, illustrating an exemplary elongated tack-off.

The proximal portion 50 the lip 30 shown in connection with the exemplary tabletop 12 may include the inner wall 54 and the outer wall 56 of the lip 30 spaced apart by a distance. For example, the inner wall 54 and the outer wall 56 may be spaced apart by a first distance, such as where the attachment portion 116 is disposed (exemplary embodiments of which are shown in FIGS. 10 and 14). The proximal portion 50 may include the inner and outer walls 54, 56 of the lip 30 spaced apart by a distance, such as where the elongated tack-off 206 is disposed (exemplary embodiments of which are shown in FIGS. 11, 13, and 15).

The distal portion 52 of the lip 30 may include the inner and outer walls 54, 56 separated by a distance. The distance separating the inner and outer walls 54, 56 in the distal portion 52 of the lip 30 may be generally equal to the distance separating the inner and outer walls 54, 56 where the elongated tack-off 206 is disposed. One skilled in the art, after reviewing this disclosure, will appreciate that the lip 30 may have other suitable shapes, sizes, configurations, and/or arrangements.

The guides 202 and the alignment portions 140 may have a similar purpose or function, but different structures. For example, the alignment portions 140 may be formed in the inner wall 54 of the lip 30, and the alignment portions 140 may extend inwardly towards the center portion 34 of the tabletop 12. The guides 202, however, may be formed in the inner wall 54 of the lip 30, and the guides 202 may protrude or project inwardly towards the center portion 34 of the tabletop 12. Thus, in an exemplary embodiment, the inner wall 54 of the lip 30 may be a generally planar structure, but may include one or more inwardly extending structures such as the attachment portions 116 and/or the guides 202.

After reviewing this disclosure, one skilled in the art will understand that the table 10, and parts and components of the table 10 such as the tabletop 12, may have different shapes, sizes, configurations and/or arrangements depending, for example, upon the intended use of the table 10. It will also be understood that the table 10 and tabletop 12 and may include any suitable number and combination of features, aspects, and components; but none of the features, aspects or components may be required. In addition, it will be understood that features, aspects, and components may have particular shapes, sizes, configurations, and/or arrangements depending, for example, upon projected use, intended function, and/or desired strength, rigidity, and/or structural integrity.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A blow-molded plastic structure comprising:
a tabletop including an upper surface, a lower surface, and a hollow interior portion disposed between the upper surface and the lower surface of the tabletop;
a lip extending downwardly relative to the lower surface of the tabletop, the lip including an outer surface and an inner surface;
at least two supports disposed in the inner surface of the lip;
one or more joints disposed in the inner surface of the lip, a joint of the one or more joints disposed between adjacent supports of the at least two supports, the joint disposed between the adjacent supports at least substantially prevents fluid flow between the adjacent supports; and
a compression edge disposed in a distal portion of the lip between the adjacent supports of the at least two supports.

2. The blow-molded plastic structure of claim 1, wherein the joint at least substantially extends between the adjacent supports of the at least two supports; and
wherein the compression edge at least substantially extends between the adjacent supports of the at least two supports.

3. The blow-molded plastic structure of claim 1, wherein the tabletop, the lip, the at least two supports, the one or more joints, and the compression edge are integrally formed as part of a unitary, one-piece structure.

4. The blow-molded plastic structure of claim 1, wherein the tabletop includes a perimeter; and
wherein a combined length of the plurality of the at least two supports and the one or more joints comprises a length that is:
greater than fifty percent (50%) of the perimeter,
greater than sixty percent (60%) of the perimeter,
greater than seventy percent (70%) of the perimeter,
greater than eighty percent (80%) of the perimeter, or
greater than ninety percent (90%) of the perimeter.

5. The blow-molded plastic structure of claim 1, wherein adjacent supports of the at least two supports are spaced generally an equidistance apart along a side of the blow-molded plastic structure.

6. The blow-molded plastic structure of claim 1, wherein adjacent supports of the at least two supports are spaced generally an equidistance apart along at least a portion of the tabletop.

7. The blow-molded plastic structure of claim 1, further comprising a side rail of a frame, the side rail including an upper portion that supports the lower surface of the tabletop, a first segment that supports one or more supports of the at least two supports, and a second segment that supports a distal portion of the lip.

8. The blow-molded plastic structure of claim 1, wherein a lower portion of the at least two supports contacts the compression edge; and
wherein a lower portion of the one or more joints contacts the compression edge.

9. The blow-molded plastic structure of claim 1, wherein an average height of the at least two supports is generally equal to an average height of the one or more joints.

10. The blow-molded plastic structure of claim 1, further comprising an attachment portion disposed in the inner surface of the lip, a lower portion of the attachment portion contacting the compression edge.

11. The blow-molded plastic structure of claim 1, further comprising an attachment portion disposed in the inner surface of the lip, a height of the attachment portion generally equal to an average height of the at least two supports and generally equal to an average height of the one or more joints.

12. A molded plastic tabletop comprising:
an upper surface;
a lower surface;
a hollow interior portion at least partially disposed between the upper surface and the lower surface of the tabletop;
a lip extending downwardly relative to the lower surface of the tabletop, the lip including an inner surface;
two or more supports disposed in the inner surface of the lip;
one or more joints disposed in the inner surface of the lip, wherein a joint of the one or more joints is disposed between a pair of adjacent supports of the two or more supports; and
a compression edge disposed in at least a portion of the lip;
wherein a portion of one or more of the supports contacts the compression edge; and
wherein a portion of one or more of the joints contacts the compression edge.

13. The molded plastic tabletop as in claim 12, wherein a joint of the one or more joints at least substantially prevents fluid flow between adjacent supports of the two or more supports.

14. The molded plastic tabletop of claim 12, further comprising a frame, the frame including an upper portion that buttresses the lower surface of the tabletop, a first segment that buttresses one or more supports of the two or more supports, and a second segment that buttresses a distal portion of the lip.

15. The molded plastic tabletop of claim 12, further comprising an attachment portion disposed in the inner surface of the lip, a height of the attachment portion generally equal to an average height of the two or more supports and generally equal to an average height of the one or more joints.

16. The molded plastic tabletop of claim 12, wherein an average height of the two or more supports is generally equal to an average height of the one or more joints.

17. A molded plastic tabletop comprising:
an upper surface;
a lower surface;
a hollow interior portion at least partially disposed between the upper surface and the lower surface of the tabletop;
a lip extending downwardly relative to the lower surface of the tabletop, the lip including an inner surface;
a plurality of supports disposed in the inner surface of the lip; and
a plurality of joints disposed in the inner surface of the lip;

wherein an average height of the plurality of supports is generally equal to an average height of the plurality of joints.

18. The molded plastic tabletop of claim 17, wherein a joint of the plurality of joints at least substantially prevents fluid flow between adjacent supports of the plurality of supports.

19. The molded plastic tabletop of claim 17, further comprising a frame, the frame including an upper portion that buttresses the lower surface of the tabletop, a first segment that buttresses one or more supports of the plurality of supports, and a second segment that buttresses a distal portion of the lip.

20. The molded plastic tabletop of claim 17, wherein a lower portion of one or more of the plurality of supports contacts a compression edge disposed in at least a portion of the lip; and wherein a lower portion of one or more of the plurality of joints contacts the compression edge.

* * * * *